United States Patent

Fox et al.

[15] 3,670,306

[45] June 13, 1972

[54] PROCESS FOR DATA COMMUNICATION BETWEEN DATA PROCESSING SYSTEMS

[72] Inventors: David J. Fox, Phoenix; Jane E. King, Sun City; Orazio J. Nardelli, Phoenix, all of Ariz.

[73] Assignee: Honeywell Information Systems Inc., Waltham, Mass.

[22] Filed: March 1, 1971

[21] Appl. No.: 120,021

[52] U.S. Cl. ..............................................340/172.5, 444/1

[51] Int. Cl. ..............................................G06f 15/16

[58] Field of Search ....................340/172.5; 235/157; 444/1

[56] References Cited

UNITED STATES PATENTS

| | | | |
|---|---|---|---|
| 3,496,551 | 2/1970 | Driscoll et al. | 340/172.5 |
| 3,312,951 | 4/1967 | Hertz | 340/172.5 |
| 3,560,937 | 2/1971 | Fischer | 340/172.5 |
| 3,530,438 | 9/1970 | Mellen et al. | 340/172.5 |
| 3,445,822 | 5/1969 | Driscoll | 340/172.5 |

*Primary Examiner*—Paul J. Henon
*Assistant Examiner*—Mark Edward Nusbaum
*Attorney*—Hanifin and Jancin and Homer L. Knearl

[57] ABSTRACT

A process is disclosed which provides for data communication among two or more data processing systems interconnected by a single physical communication channel. A communication is initiated by utilizing one of a plurality of storage areas in the memory of one of the data processing systems. Data and control information necessary for preparing for a communication is stored in a storage area to await processing by the appropriate data processing system. While the control information from one storage area is being processed, control information relating to a different communication may be stored in another storage area. In this manner, many communications among the data processing systems may be processed in an apparently parallel fashion.

19 Claims, 28 Drawing Figures

INVENTORS
ORAZIO J. NARDELLI
JANE E. KING
BY DAVID J. FOX
Calvin E. Thorpe
ATTORNEY

ROUTINE IN SATELLITE COMPUTER WHICH RESPONDS TO REQUEST FROM TERMINAL

ROUTINE IN SATELLITE COMPUTER WHICH RESPONDS TO AN INTERRUPT FROM CENTRAL COMPUTER

FIG. 4A PROCESS PERFORMED IN SATELLITE COMPUTER
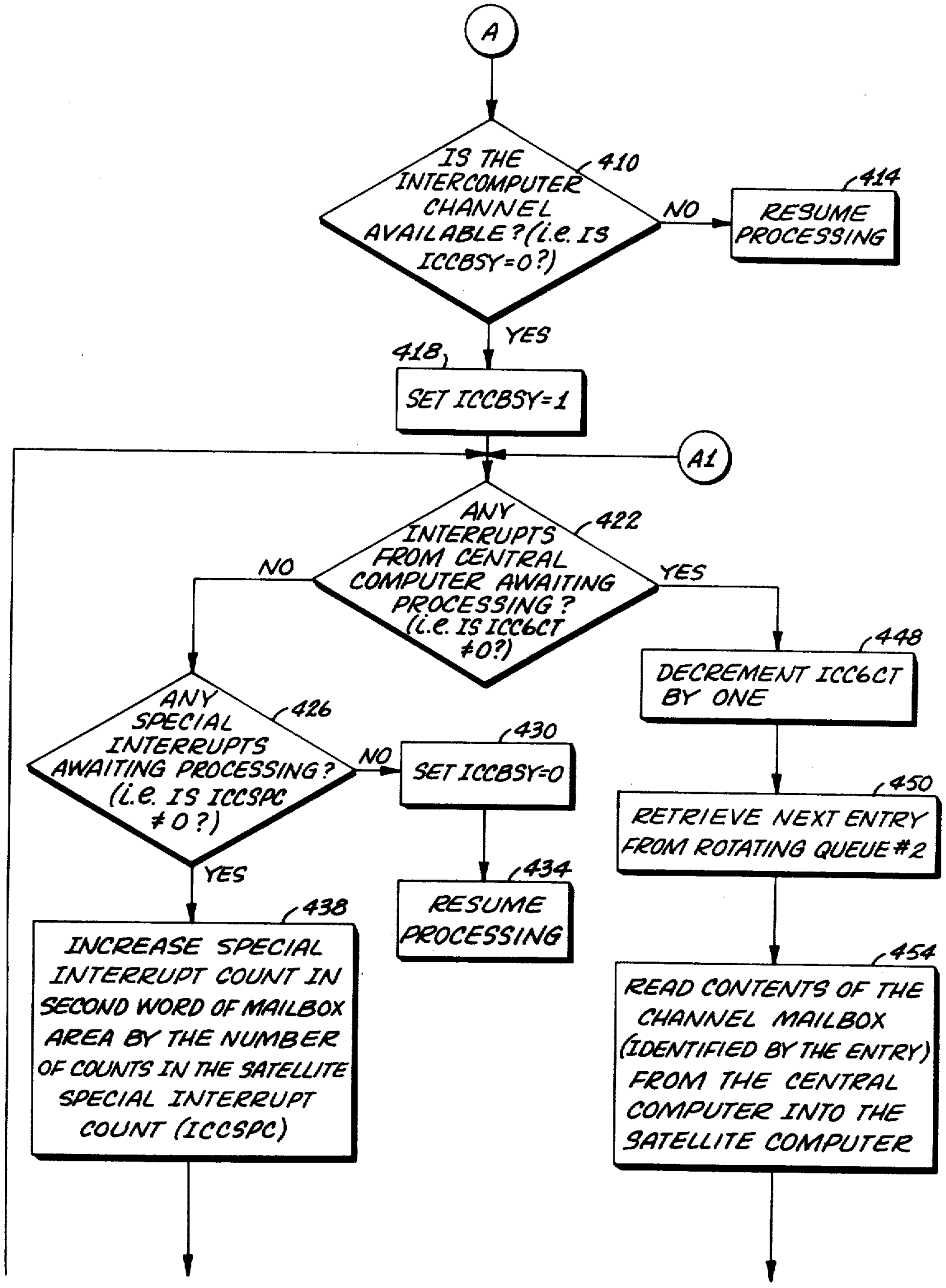

READ CONTROL DATA

SATELLITE COMPUTER TRANSMITTING TERMINAL DATA TO CENTRAL COMPUTER

CENTRAL COMPUTER TRANSMITTING DATA TO SATELLITE COMPUTER

FIG. 8A PROCESS PERFORMED IN THE CENTRAL COMPUTER IN RESPONSE TO AN INTERRUPTION BY THE SATELLITE COMPUTER
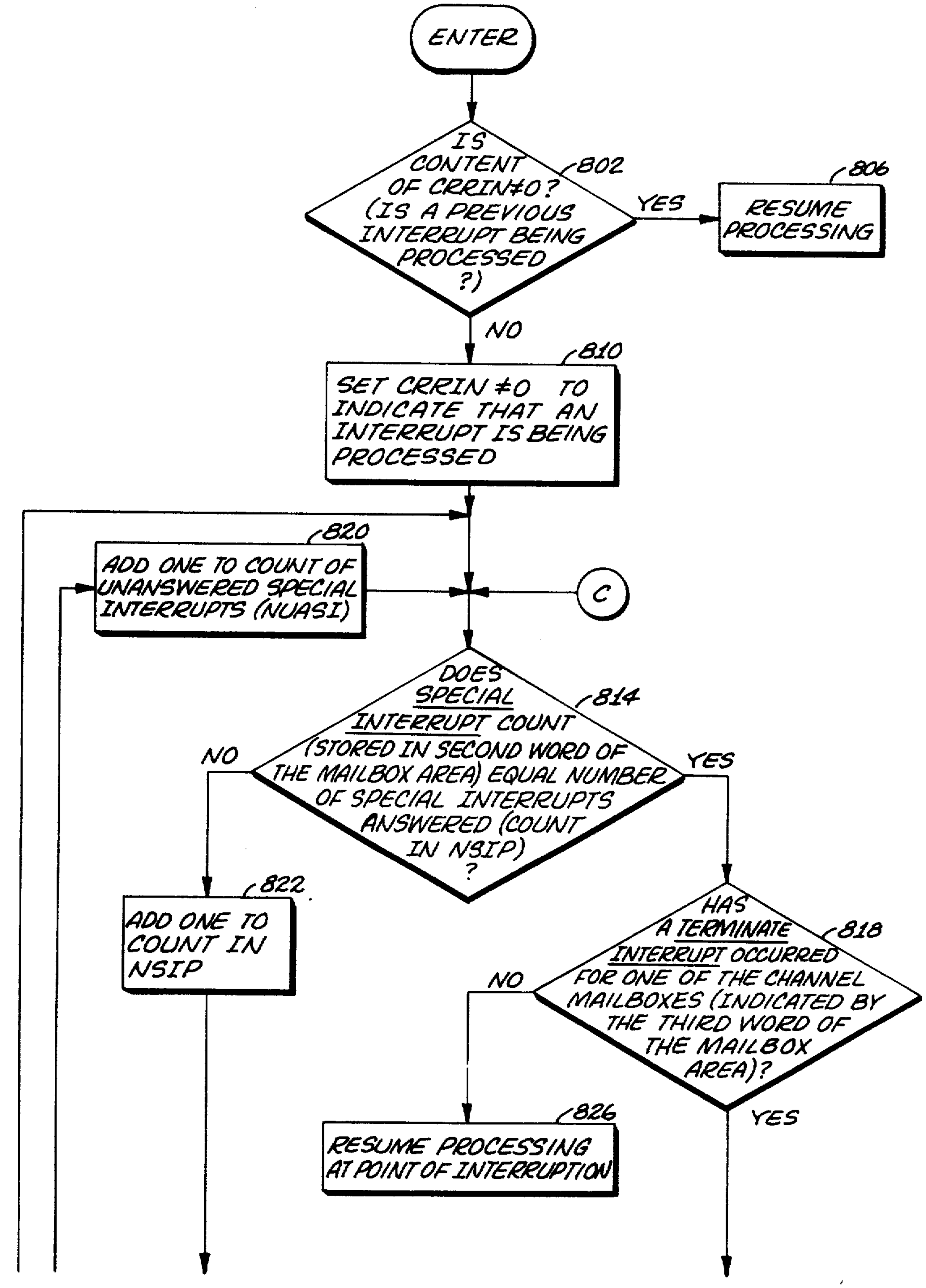

PROGRAM RGIN - HAS BEEN NOTIFIED (SEE R32) THAT A TERMINAL WISHES TO SEND INPUT. RGIN IS NOW READY TO RECEIVE AND IT THEREFORE CALLS UPON A SUBROUTINE TO PERFORM THE TRANSMISSION.

PROGRAM GEOT-HAS BEEN NOTIFIED (SEE R35) THAT A TERMINAL IS READY TO RECEIVE OUTPUT. GEOT FINDS THE OUTPUT AND CALLS UPON A SUBROUTINE TO PERFORM THE TRANSMISSION.

PROGRAM RUNNING IN CENTRAL COMPUTER WISHES TO COMMUNICATE WITH A TERMINAL HAVING A SPECIFIC CONNECT-TO-PROGRAM NAME — CALLS UPON A SUBROUTINE TO INQUIRE ABOUT SUCH A TERMINAL

| SATELLITE COMPUTER | CENTRAL COMPUTER |
|---|---|
| 1. TERMINAL A HAS DATA TO SEND TO CENTRAL COMPUTER | |
| 2. ADD ONE TO SPECIAL INTERRUPT COUNT (ICCSPC) | |
| 3. ADD CONTENTS OF ICCSPC TO COUNT IN SECOND WORD OF CENTRAL COMPUTER'S MAILBOX AREA (MBXA) | |
| 4. INTERRUPT CENTRAL COMPUTER → | |
| 5. ANY MORE REQUESTS TO PROCESS? ↓ NO END | 101. COUNT IN SECOND WORD OF MBXA=NSIP? ↓ NO |
| | 102. ADD ONE TO NSIP |
| | 103. FIND AN AVAILABLE CHANNEL MAILBOX [IDENTIFY AS MBX(i)] |
| | 104. PLACE "READ CONTROL DATA" COMMAND IN MBX(i) |
| | 105. PLACE CHANNEL NUMBER (i) IN FIRST WORD OF MBXA |
| ← | 106. INTERRUPT SATELLITE COMPUTER |
| 6. READ CONTENTS OF MBX(i) | 107. ANY MORE INTERRUPTS TO PROCESS? ↓ NO END |
| 7. PLACE TERMINAL A IDENTIFICATION AND "ACCEPT INPUT" OPERATION CODE IN SATELLITE'S MAILBOX STORAGE AREA (SMBX) | |

FIG. 18A

SATELLITE COMPUTER

19. ANY MORE REQUESTS TO PROCESS?
↓ NO
END

20. READ CONTENTS OF MBX(i)

21. PLACE TERMINAL B IDENTIFICATION AND "SEND OUTPUT" OPERATION CODE IN SMBX

22. TRANSFER CONTENTS OF SMBX TO MBX(i)

23. SET BIT IN THIRD WORD OF MBXA INDICATING A T.I. HAS OCCURRED FOR MBX(i)

CENTRAL COMPUTER

113. COUNT IN SECOND WORD OF MBXA=NSIP?
↓ NO

114. ADD ONE TO NSIP

115. FIND AN AVAILABLE CHANNEL MAILBOX MBX(i)

116. PLACE "READ CONTROL DATA" COMMAND IN MBX(i)

117. PLACE CHANNEL NUMBER (i) IN FIRST WORD OF MBXA

118. INTERRUPT SATELLITE COMPUTER →

119. COUNT IN SECOND WORD OF MBXA=NSIP?
↓ NO

120. ADD ONE TO NSIP

121. FIND AN AVAILABLE CHANNEL MAILBOX MBX(j)

122. PLACE "READ CONTROL DATA" COMMAND IN MBX(j)

123. PLACE CHANNEL NUMBER (j) IN FIRST WORD OF MBXA

124. INTERRUPT SATELLITE COMPUTER →

125. ANY MORE INTERRUPTS TO PROCESS?
↓ NO
END

FIG. 18C

SATELLITE COMPUTER

49. ANY MORE REQUESTS TO PROCESS ?

↓ YES

50. READ CONTENTS OF MBX (j)

51. READ DATA FROM LOCATION Y OF CENTRAL COMPUTER MEMORY TO SATELLITE COMPUTER MEMORY

52. PLACE TRANSACTION STATUS INFORMATION IN SMBX

53. TRANSFER CONTENTS OF SMBX TO MBX (j)

54. SET BIT IN THIRD WORD OF MBXA INDICATING T.I. HAS OCCURRED FOR MBX(j)

55. INTERRUPT CENTRAL COMPUTER →

56. NOTIFY TERMINAL B THAT SATELLITE COMPUTER HAS RECEIVED OUTPUT DATA FROM CENTRAL COMPUTER

57. ANY MORE REQUESTS TO PROCESS ?

↓ YES

58. READ CONTENTS OF MBX(i)

CENTRAL COMPUTER

162. COUNT IN SECOND WORD OF MBXA = NSIP ?

↓ NO

163. ADD ONE TO NSIP

164. FIND AVAILABLE MBX (i)

165. PLACE "READ CONTROL DATA" COMMAND IN MBX(i)

166. PLACE CHANNEL NUMBER (i) IN FIRST WORD OF MBXA

167. INTERRUPT SATELLITE COMPUTER

168. ANY MORE INTERRUPTS TO PROCESS ?

↓ NO

END

169. COUNT IN SECOND WORD OF MBXA = NSIP ?

↓ YES

170. ANY BITS SET FOR T.I. ?

↓ YES

171. "TURN OFF" BIT FOR MBX(j) IN THIRD WORD OF MBXA

172. NOTIFY PROGRAM SENDING DATA THAT TRANSMISSION IS COMPLETE

FIG. 18G

SATELLITE COMPUTER

59. PLACE TERMINAL C IDENTIFICATION AND "CONNECT-TO-PROGRAM" OPERATION CODE IN SMBX

60. TRANSFER CONTENTS OF SMBX TO MBX(i)

61. SET BIT IN THIRD WORD OF MBXA INDICATING A T.I. HAS OCCURRED FOR MBX(i)

62. INTERRUPT CENTRAL COMPUTER →

63. ANY MORE REQUESTS TO PROCESS?

↓ NO

END

CENTRAL COMPUTER

173. RELEASE MBX(j)

174. ANY MORE INTERRUPTS TO PROCESS?

↓ NO

END

175. COUNT IN SECOND WORD OF MBXA = NSIP ?

↓ YES

176. ANY BITS SET FOR T.I. ?

↓ YES

177. "TURN OFF" BIT FOR MBX(i) IN THIRD WORD OF MBXA

178. STORE INDICATION IN TABLE OF LINE DESCRIPTIONS THAT TERMINAL C WISHES TO CONNECT TO A PROGRAM

179. PLACE NAME SUPPLIED BY TERMINAL C IN TABLE OF LINE DESCRIPTIONS

180. RELEASE MBX(i)

181. ANY MORE INTERRUPTS TO PROCESS?

↓ NO

END

FIG. 18H

PROCESS FOR DATA COMMUNICATION BETWEEN DATA PROCESSING SYSTEMS

BACKGROUND OF THE INVENTION

This invention relates to methods of operating data processing systems and more particularly to a method of operating two or more interconnected data processing systems to enable communication therebetween.

The desirability of providing communication capabilities among computers rotating well recognized in the data processing industry. For example, it has been found advantageous to connect a "central" general purpose computer to one or more "satellite computers" in a configuration in which the satellite computers perform and control the bulk of the data input and output functions required for the system while the central computer performs and controls computational operations. Each satellite computer gathers data from a number of input devices, prepares and formats the data, and then transmits it to the central computer for processing. The central computer, in turn, processes the data and then transmits the resultant to the appropriate satellite computer for distribution to appropriate output devices. It is apparent that, in this configuration, the efficiency of communication between the central computer and a satellite computer could significantly affect the efficiency of operation of the overall system.

In the prior art, communication between computers has normally been carried out utilizing a single communication channel to connect the computers and then either processing each transaction between the computer serially or employing special multiplexing apparatus of some type to allow the transactions to be processed in an apparently parallel manner. Processing the transactions serially is inefficient since the channel may go unused at various times during the processing of any particular transaction even though other transactions are awaiting processing. On the other hand, employment of special mutiplexing apparatus to more efficiently utilize the channel is costly.

SUMMARY OF THE INVENTION

It is an object of the present invention to provide a method of operating interconnected computers to communicate in an efficient and economical manner.

It is another object of the present invention to provide a method of operating computers interconnected by a single communication channel so that transactions between the computers are processed in an apparently parallel manner.

It is still another object of the present invention to provide apparently parallel data transmission between computers over a single communication channel without requiring special multiplexing apparatus.

These and other objects of the present invention are realized in a specific illustrative embodiment in which a satellite computer, upon determining that communication with a central computer to which it is connected is desired, sends a "special interrupt" signal to the central computer specifying the number of transactions needing processing. The central computer responds by selecting an available one of a plurality of storage areas in its memory — these storage areas may be referred to as "channel mailboxes." The central computer then places a "what do you want" query in the selected channel mailbox, stores the identity of the selected channel mailbox in another portion of its memory, and sends an interrupt signal to the satellite computer. If more than one transaction needs processing the central computer would repeat the above channel mailbox selection process in accordance with the number of transactions to be processed.

The satellite computer, in response to an interrupt signal from the central computer, accesses that portion of the central computer's memory wherein the selected channel mailboxes' identities are stored, determines one such identity, and reads the contents of the identified channel mailbox. In response to these contents, the satellite computer writes data into the identified channel mailbox indicating what type of transaction or operation is to be performed (e.g. transmission to or from the central computer) and sends a "terminate interrupt" signal to the central computer indicating that the central computer is to examine the contents of the identified mailbox. The satellite computer repeats the above process for other channel mailboxes selected by the central computer.

In response to the terminate interrupt signal and to the data stored in the channel mailbox, the central computer selects an available channel mailbox and stores therein a command to send data (if transmission from the satellite computer to the central computer were desired) or a command to retrieve data (if transmission from the central computer to the satellite computer were desired) and the memory location address in the central computer where data is to be stored or from where data is to be retrieved, as the case may be. The central computer then stores the identity of the selected channel mailbox in another portion of its memory and sends an interrupt signal to the satellite computer.

The satellite computer responds by either transmitting data to or retrieving data from the designated memory location in the central computer.

As will be made clear in the detailed description to follow, other operations besides those described above may be performed by the satellite computer and central computer.

BRIEF DESCRIPTION OF THE DRAWINGS

A complete understanding of the present invention and of the above and other advantages thereof may be gained from a consideration of the following detailed descriptions of an illustrative showing thereof presented hereinbelow in connection with the accompanying drawings in which:

FIGS. 4A and 4B show a flow diagram representing a specific illustrative machine algorithm for practicing data processing on a satellite computer in accordance with the present invention;

FIGS. 8A through 8C show a flow diagram representing a specific illustrative machine algorithm for practicing data processing on a central computer in accordance with the present invention;

FIGS. 18A through 18I show a representation of the steps performed by a central computer and satellite computer in processing several exemplary transactions in accordance with the present invention.

DETAILED DESCRIPTION

As indicated earlier, the present invention allows the apparently parallel processing of a plurality of transactions between a central computer and a satellite computer. The term "transaction" as used in this context will be defined to mean a sequential (in time) series of events or operations necessary to convey a component of information between the two computers. A transaction will be initiated by the transmission between computers of a control signal or signals followed by the transmission of data or perhaps more control signals and terminated by the transmission again of a control signal or signals.

The process of the present invention as represented by the drawings will be described for a system including a central computer connected by a single physical communication channel to a satellite computer. It can also be assumed for illustrative purposes that the satellite computer is in turn connected to a plurality of input and output devices from which and to which data is to be transmitted. The central computer of the system might illustratively comprise a Honeywell Series 635 computer, as disclosed in U.S. Pat. No. 3,409,880 and U.S. Pat. No. 3,413,613, and equipped with the General Macro Assembly Program (G.M.A.P.) Compiler, as described in Honeywell series 6000/600 Programming Reference Manual, BN–86, July 1969 edition. The satellite computer of the system might illustratively comprise the Honeywell DATANET 355 computer, equipped with the Macro Assembly Program (M.A.P.) Compiler, as described in the Honeywell Datanet 355 M.A.P. Reference Manual, BB–98, August 1970 edition. An illustrative example of the method disclosed herein is described in the Honeywell Series 6000/600 G.R.T.S./355 Programming Reference Manual, B.J. 66, January 1971.

All communication between the satellite computer and central computer takes place via a so-called mailbox area of the central computer's memory. This is a region in the central computer's memory to which both the central computer and satellite computer have direct access.

Figure 1:
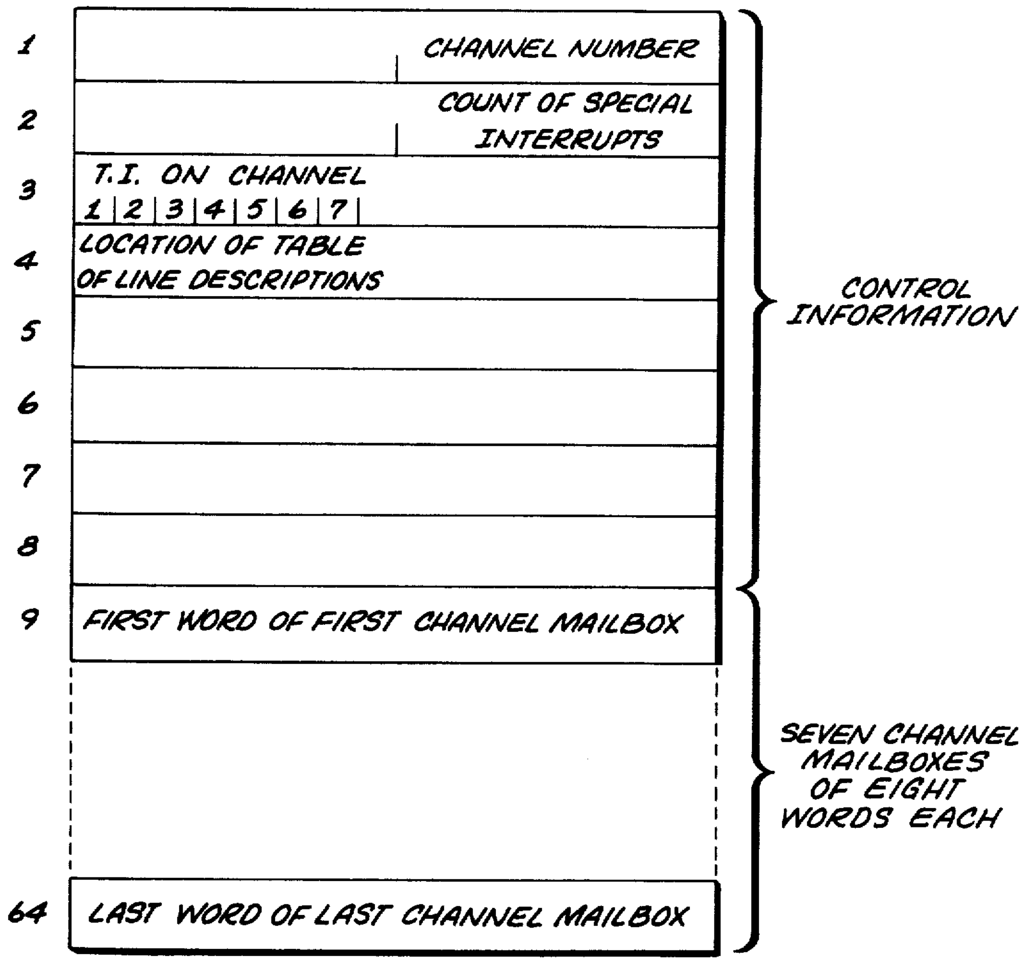
FIG. 1 shows a graphical representation of an illustrative format of the mailbox area of storage of a central computer utilized in accordance with the present invention.

An illustrative format for the mailbox area is graphically represented in FIG. 1. The format thereshown includes a block of 64 words of 36 bits each. The first eight words of the mailbox area are used for control purposes, e.g., to inform the satellite or central computer that a transaction is to be performed, to identify the "channel" over which the transaction is to be carried out, etc. The last 56 words of the mailbox area are used for seven separate eight-word "channels" (called "channel mailboxes") via which communication between the central computer and satellite computer takes place.

The first, second, third and fourth words of the mailbox area are used to store specific information (to be discussed later) whereas the fifth, sixth, seventh and eighth words are available for storing general control information. Utilization of the mailbox area by the central and satellite computers will become clear as the detailed description continues.

Operation of Satellite Computer

Figure 2:
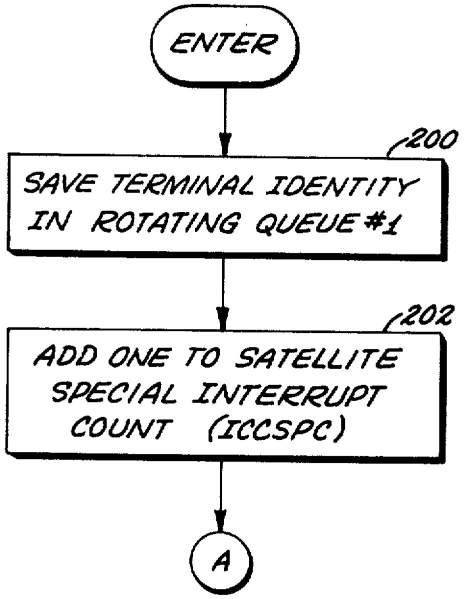
FIG. 2 shows a flow diagram of specific illustrative routine performed in a satellite computer in response to a terminal request in accordance with the present invention.

The processing of a transaction between the central and satellite computers may (L) initiated by either computer. FIG. 2 shows a routine, carried out by the satellite computer in response to a request from one of the satellite terminals, which will cause the satellite computer to initiate processing of a transaction. The first step of this routine, as indicated by block 200 of FIG. 2, is simply to store the identity of the requesting terminal in a rotating queue identified as rotating queue no. 1. A rotating queue is simply a queued list of items through which the computer will later search in a "rotating" manner. That is, the computer will search through the list item by item until the last item in the list is examined after which the computer will return again to the first of the list.

After the terminal identity has been stored in the rotating queue, a so-called satellite special interrupt count (ICCSPC) is incremented by one (block 202). This count may have been incremented by previous terminal request and thus may have a value greater than one. Following the incrementing of ICCSPC, the routine of FIG. 2 enters a process illustrated by the flow chart of FIGS. 4A and 4B.

Figure 3:
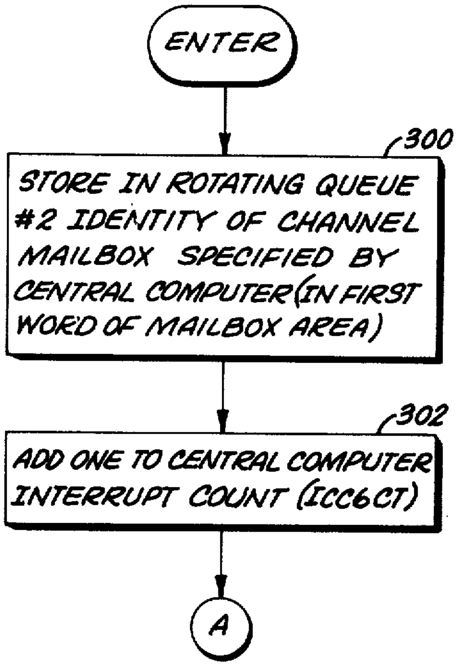
FIG. 3 shows a flow diagram of a specific illustrative routine performed in a satellite computer in response to an interrupt from a central computer in accordance with the present invention.

FIG. 3 shows a routine carried out by the satellite computer in response to an interrupt from the central computer. Such an interrupt is simply a signal from the central computer to the satellite computer indicating that the satellite computer is to take certain action. The first step of the routine (block 300) is to store in another rotating queue, identified as rotating queue no. 2, the identity of the channel mailbox as specified in the first word of the mailbox area (see FIG. 1). The specified channel mailbox will have been selected by the central computer as the channel mailbox via which the transaction in question is to be processed. The identity of the channel mailbox will have been conveyed to the satellite computer at the time the satellite computer was interrupted. The process of such selection will be discussed later when describing the processing performed by the central computer.

Figure 4B:
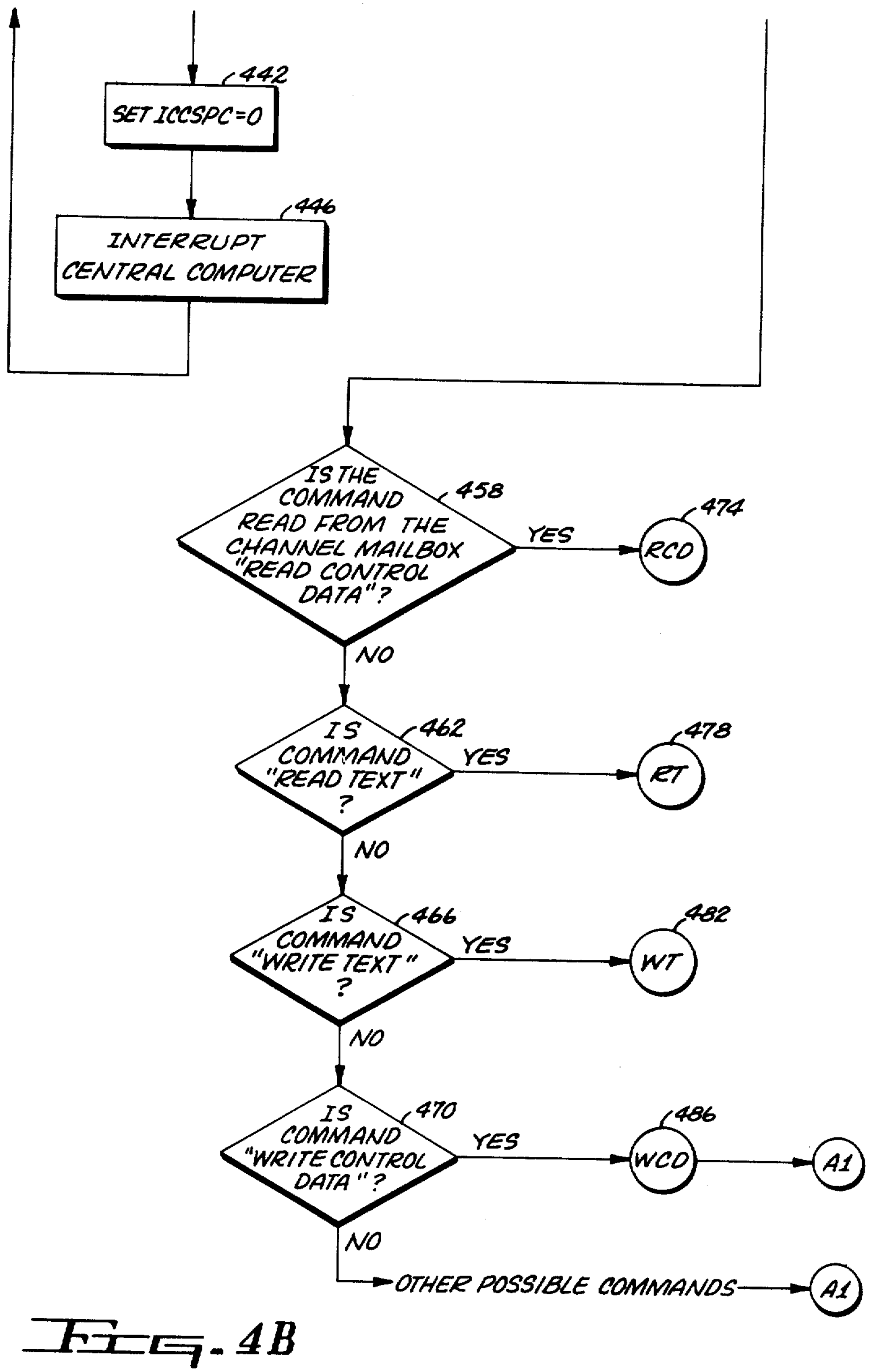

The final step of the FIG. 3 routine is to add one to a central computer interrupt count ICC6CT stored in the satellite computer's memory (block 302), after which the routine moves via link A to the process of FIGS. 4A and 4B.

The transaction processing performed by the satellite computer following the execution of either the FIG. 2 or FIG. 3 is illustrated by the flow chart of FIGS. 4A and 4B. The first step of this process is to determine whether the physical communication channel connecting the central computer to the satellite computer is available for use (block 410). This is done by examining a variable, identified as ICCBSY and stored in the satellite computer's memory, to determine if this variable equals zero. If it does not equal zero, the channel is being utilized in which case the satellite computer resumes normal processing (block 414), i.e., it resumes at the point it was interrupted by either a central computer interrupt or a special interrupt request. If the channel is available, the variable ICCBSY is set equal to one (block 418) and the process moves to block 422.

In the step represented by block 422, it is determined if any interrupts from the central computer are awaiting processing. This is done by checking the central computer interrupt count ICC6CT referred to earlier in connection with block 302 of FIG. 3. If no such interrupts are awaiting processing, i.e. if ICC6CT = 0, the process moves to block 426 where it is determined whether any special interrupts are awaiting processing (i.e. whether the variable ICCSPC $\neq$ 0). This step may seem unnecessary since the process of composite FIG. 4 is entered following either a central computer interrupt or a special interrupt (request from a terminal) and thus if no central computer interrupt is awaiting processing, it would appear that a special interrupt must necessarily be awaiting processing. However, the FIG. 4 process, beginning with step 422, may also be entered from block 446 of FIG. 4B (as indicated by the arrow from block 446 to a point just above block 422). Thus, when the process returns to blocks 422 and 426, perhaps neither a central computer interrupt nor a special interrupt will be awaiting processing. If this is the case, the process moves to block 430 where the variable ICCBSY is set equal to zero, indicating that the channel connecting the computers is available. Then, as indicated by block 434, the satellite computer resumes normal processing.

If there are special interrupts awaiting processing, the process moves to block 438 of FIG. 4A where the satellite computer causes a special interrupt count stored in the second word of the mailbox area (see FIG. 1) to be incremented by a number equal to the number of counts in the satellite special interrupt count (ICCSPC). It is possible for the satellite computer to increment such a count in the central computer's memory since, as indicated earlier, the satellite computer has direct access to the mailbox area. Upon incrementing the count, the satellite computer sets the variable ICCSPC equal to zero (block 422) indicating that all special interrupts awaiting the processing have been answered. The satellite computer then interrupts the central computer in accordance with block 446 of FIG. 4B and returns to block 422 of FIG. 4A. This interrupt is simply a signal notifying the central computer that a special interrupt or terminate interrupt (discussed later) is awaiting processing.

Returning now to block 422 of FIG. 4A, if it is there determined that interrupts from the central computer are awaiting processing, i.e. that ICC6CT $\neq$ 0, the count ICC6CT is decremented by one (block 448) and the process moves to block 450 where a next entry in rotating queue no. 2 is retrieved. The entry retrieved from the rotating queue no. 2 identifies a channel mailbox in the central computer's memory from which information is to be read by the satellite computer. The reading of such information from the identified channel mailbox into a corresponding satellite mailbox storage area is carried out in accordance with block 454 of FIG. 4A. This information includes a command directing the satellite computer to perform certain functions. The identity of the command is determined by the satellite computer in accordance with blocks 458 through 470 of FIG. 4B. Four possible illustrative commands are thereshown, including the commands "read control data," "read text," "write text," and "write control data." It is also indicated in FIG. 4B at the end of the chain of blocks 458 through 470 that other commands could also be utilized in accordance with the desires of the user. Such commands, for example, might be for test or diagnostic purposes. The description of how such commands were placed in the central computer's channel mailbox will be discussed later when discussing the operation of the central computer. The functions to be carried out in accordance with these commands will now be discussed.

If the command read from the channel mailbox is "read control data," the process commences a subroutine identified as RCD (block 474 of FIG. 4B). This command will have been placed in the channel mailbox by the central computer in response to a special interrupt by the satellite computer. The command is simply an inquiry by the central computer — "what do you want?"

Figure 5:
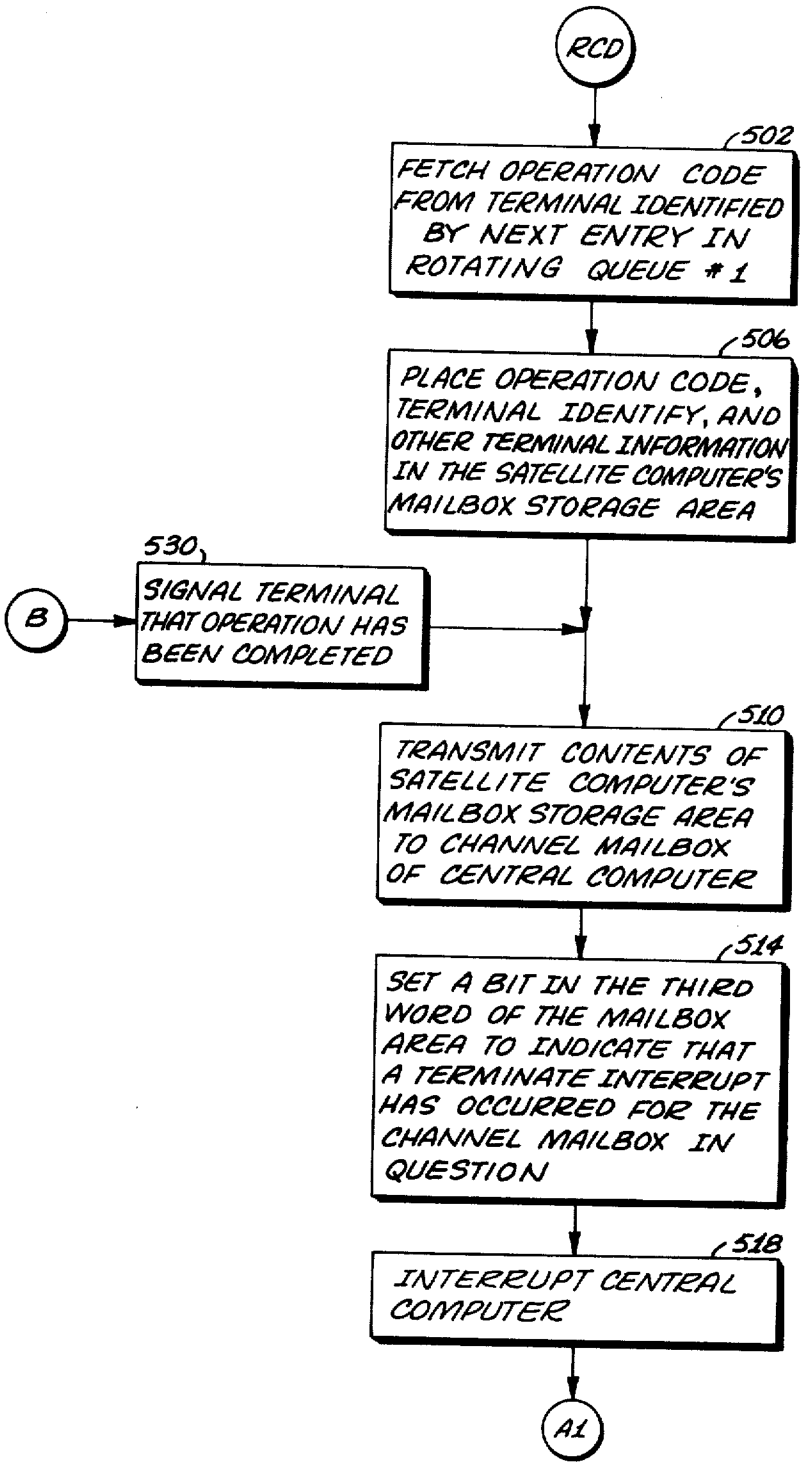
FIGS. 5, 6 and 7 show flow diagrams of specific illustrative subroutines of the algorithm of FIGS. 4A and 4B.

The first step of the subroutine RCD, shown in detail in FIG. 5, is the fetching of an operation code (which defines an operation to be performed) from the terminal identified by the next entry in rotating queue no. 1 (block 502). The placement of the terminal identity in this queue was discussed earlier in connection with FIG. 2. The operation code so retrieved and other terminal information (e.g. terminal identity and type of terminal [teletype, display screen, etc.]) is then placed in the satellite computer's mailbox storage area in accordance with block 506. This information is then transmitted to the channel mailbox being used for this transaction (block 510). The satellite computer next sets a bit in the third word of the mailbox area of the central computer to indicate that a terminate interrupt has occurred for the channel mailbox in question (block 514). The third word of the mailbox area contains a bit for each channel mailbox and it is the appropriate one of these bits which is set. Setting the bit indicates to the central computer that the satellite computer has responded to a command from the central computer. Next the satellite computer interrupts the central computer and the process then moves via link A1 to block 422 of FIG. 4A.

Entry point B and block 530 of FIG. 5 will be discussed later when discussing those portions of the process from which these steps are entered.

Returning now to FIG. 4B and specifically to step 458, if the command read from the channel mailbox is not "read control data," the process moves to block 462 where it determines if the command is "read text." If the command is "read text," the process enters the subroutine RT represented by element 478 of FIG. 4B. The "read text" command indicates that data is to be transmitted from a terminal to the central computer's memory. This process is represented by the algorithm of FIG. 6.

Figure 6:
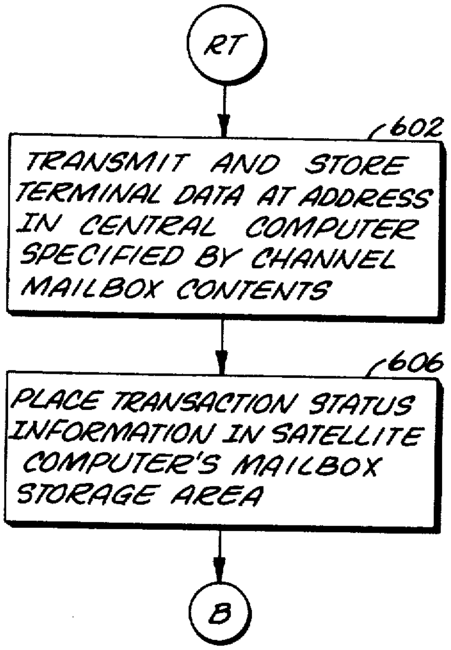

The first step of the algorithm of FIG. 6 is the transmission and storage of terminal data at the address in the central computer's memory specified by the channel mailbox contents (block 602). This address, of course, will have been specified by the central computer as will be described later. The next step of the process is the placement of information in the satellite computer's mailbox storage area identifying the status of the transaction (block 606). Such information in this case would indicate that terminal data has been transmitted to the central computer. The RT subroutine then moves via link B to block 530 of FIG. 5.

In the step represented by block 530, the satellite computer signals the terminal in question that the requested operation (in this case transmission of data to the central computer) has been completed. The process then continues with the step represented by block 510, 514 and 518 of FIG. 5 as previously described.

If, in step 462 of FIG. 4B, it is determined that the command is not "read text," the algorithm moves to block 466 where it is determined if the command is "write text." If the command is "write text," the process moves to a subroutine identified as WT (element 482 of FIG. 4B). The command "write text" indicates that the central computer is to transmit data to the satellite computer. The subroutine WT is represented by the flow chart of FIG. 7.

Figure 7:
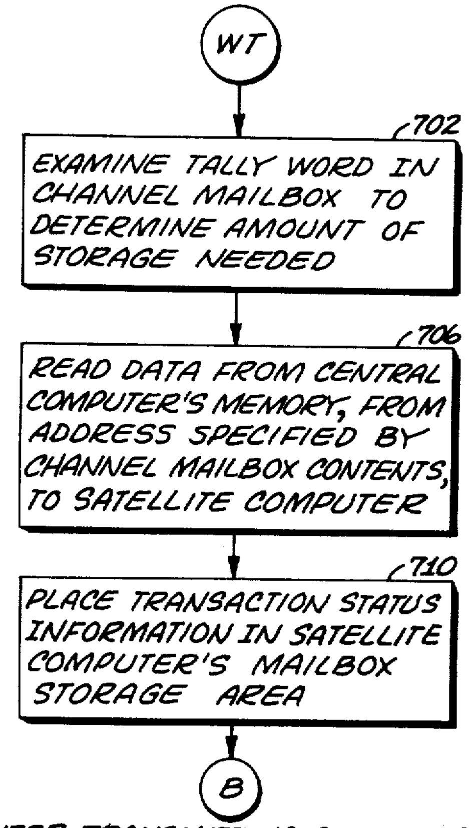

The first step of the FIG. 7 algorithm (block 702) is to examine a so-called tally word which has been stored in the channel mailbox by the central computer and which indicates the amount of storage which will be needed by the satellite computer. When the amount of storage is determined, the data is read from the central computer's memory, from the address specified by the channel mailbox contents, to the satellite computer (block 706). Transaction status information indicating that the data has been read, is then placed in the satellite computer's mailbox storage area (block 710). The process then moves via link B to block 530 of FIG. 5 similarly as described for the RT subroutine.

If it is determined that the command is not "write text" (block 466 of FIG. 4B), the algorithm moves to block 470 where it is determined if the command is "write control data." The command "write control data" directs the satellite computer to execute certain control operations such as disconnecting a terminal line, terminating further input from a terminal, etc. Execution of such operations is not considered part of the present invention and thus is only represented generally by the element 486 of FIG. 4B.

As indicated earlier, other possible commands may be utilized in addition to the four represented by FIG. 4B. After the execution of such commands, the process of composite FIG. 4 returns via link A1 to step 422 of FIG. 4A. This concludes the description of the operations performed by the satellite computer in the illustrative implementation of the present invention.

Operation of Central Computer

The processes performed in the central computer in response to an interruption by the satellite computer are shown generally in FIGS. 8 through 14. An interruption by the satellite computer is effected in the central computer by the central computer executing two instructions. These instructions, although not part of the present invention, will be briefly described. The first instruction is a bookkeeping instruction necessary for the central computer to know where it is to resume processing after responding to the interrupt. Execution of this instruction results in the storage of (a) the location of the next instruction to execute upon resumption of normal processing and (b) the data being processed by the interrupted program. The second of the instructions simply transfers control of the central computer from the interrupted program to the program or process which will next be discussed in connection with FIGS. 8 through 14.

The first step of the process of FIG. 8A is to determine if a previous interrupt is being processed. This is done by examining the contents of a memory location identified as CRRIN (block 802). If the contents of the location CRRIN is not zero, indicating a previous interrupt is being processed, then the processing of that previous interrupt is resumed as indicated by block 806. If the contents CRRIN is zero, indicating that no previous interrupt is being processed, then the contents of CRRIN is set to something other than zero and the algorithm moves to block 814.

In the steps represented by blocks 814 and 818, the central computer determines whether the interruption by the satellite computer was a special interrupt or a terminate interrupt. Specifically, as indicated by block 814, the decision is made as to whether the special interrupt count, which is stored in the second word of the mailbox area (see FIG. 1), equals the number of special interrupts answered (a count stored in the location identified as NSIP). Inequality of the counts indicates that there are special interrupts awaiting processing in which case the process moves to block 822. There, a one is added to the count in NSIP indicating that another special interrupt has been answered. The process then moves to block 830 of FIG. 8B where it is determined if there is an available channel mailbox. If a channel mailbox is available, the central computer stores the command "read control data" in an available channel mailbox. (See block 834.) This command, as indicated earlier, functions to query the satellite computer as to what the satellite computer desires. After storing this command, the central computer stores an indication of which channel mailbox the satellite computer is to examine in the first word of the mailbox area, and then interrupts the satellite computer (block 838). The identity of the channel mailbox to be examined is conveyed to the satellite computer upon the interruption thereof. The central computer is then free to commence examining other special interrupts or possibly terminate interrupts as indicated by the arrow from block 838 returning to block 814 of FIG. 8A.

If it had been determined by the step represented by block 830 that no channel mailbox was available, the process would have moved to block 820 of FIG. 8A where a one would be added to a count of unanswered special interrupts (NUASI). This operation serves to delay the processing of an awaiting special interrupt until after a terminate interrupt has been processed (assuming that there was only one awaiting special interrupt). The reason for this is that processing of a special interrupt requires a new channel mailbox whereas the processing of a terminate interrupt does not. Thus if no channel mailboxes are available, then it is reasonable to commence processing a terminate interrupt after which a channel mailbox will usually be made available. As will be indicated later, after a terminate interrupt has been processed, the count NUASI is examined so that any unanswered special interrupts may then be processed.

If it had been determined in the step represented by block 814 that the special interrupt count equaled the count NSIP, indicating that no special interrupts were awaiting processing, then the algorithm would move to block 818. There, it is determined whether a terminate interrupt has occurred for one of the channel mailboxes. This determination is made by examining a third word of the mailbox area to see if any of the bits representing the different channel mailboxes equals one (see FIG. 1). If none of the bits equals one indicating that no terminate interrupt has occurred for any of the channel mailboxes, then normal processing is resumed at the point it was interrupted (block 826). Resumption of normal processing at this stage may leave some special interrupts unanswered — this will be the case if no channel mailboxes were available to serve the special interrupts. But, upon the future occurrence of a terminate interrupt for one of the "busy" channel mailboxes, the process of FIGS. 8A–8C would again be entered (see blocks 514 and 518 of FIG. 5) and the special interrupts could then be processed.

If, in block 818, it is determined that a particular bit in the third word of the mailbox area equals one, indicating that a terminate interrupt has occurred for the corresponding channel mailbox, the process moves to block 842 where the particular bit in question is set to zero. The contents of the channel mailbox identified by that bit is then examined to determine the type of command stored therein. Exemplary commands which may be stored in the channel mailbox, as indicated earlier when discussing the operation of the satellite computer, are "read control data" (block 846), "read text" or "write text" (block 850), and "write control data" (the "No" branch of block 850). Whichever command is found in the channel mailbox would have been placed there earlier by the central computer (for example, see block 834).

Figure 9:
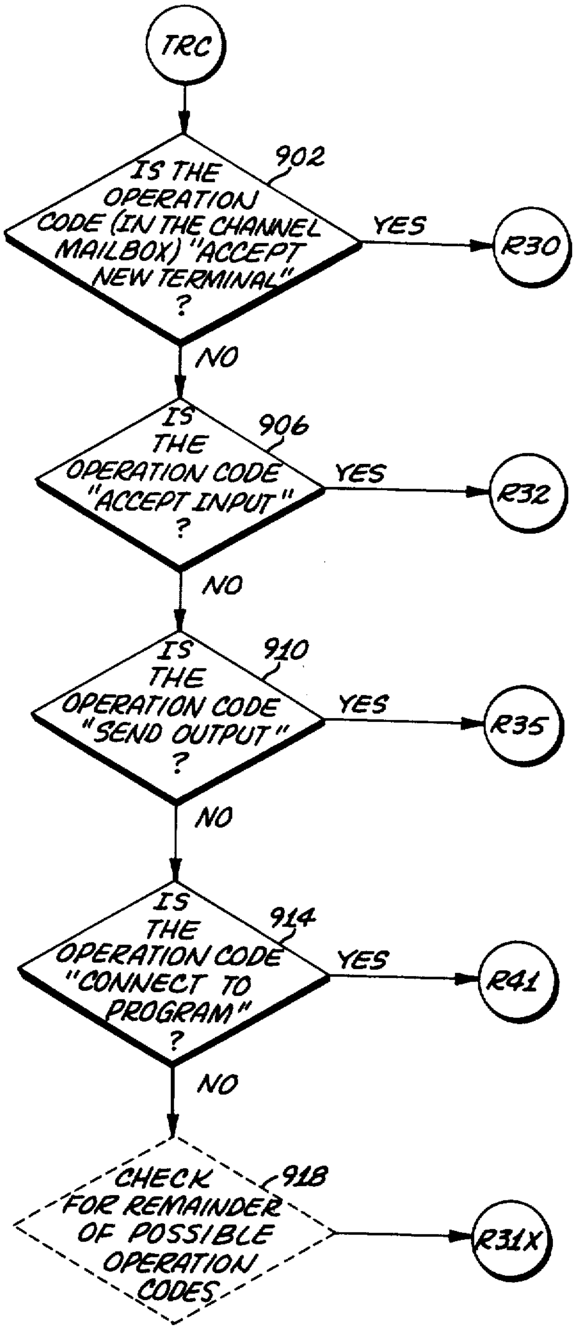
FIGS. 9, 10, 11, 12, 13 and 14 show flow diagrams of specific illustrative subroutines of the algorithm of FIGS. 8A through 8C.

If it is determined that the command is "read control data," then the process enters a subroutine identified as TRC (block 846). A flow chart of this subroutine is shown in FIG. 9. The subroutine TRC includes a number of other subroutines the performance of which is determined by the type of operation code found in the channel mailbox in question. The first step of TRC is to determine if the operation code stored in the channel mailbox is "accept new terminal" (block 902). If it is, the process enters subroutine R30.

Figure 10:
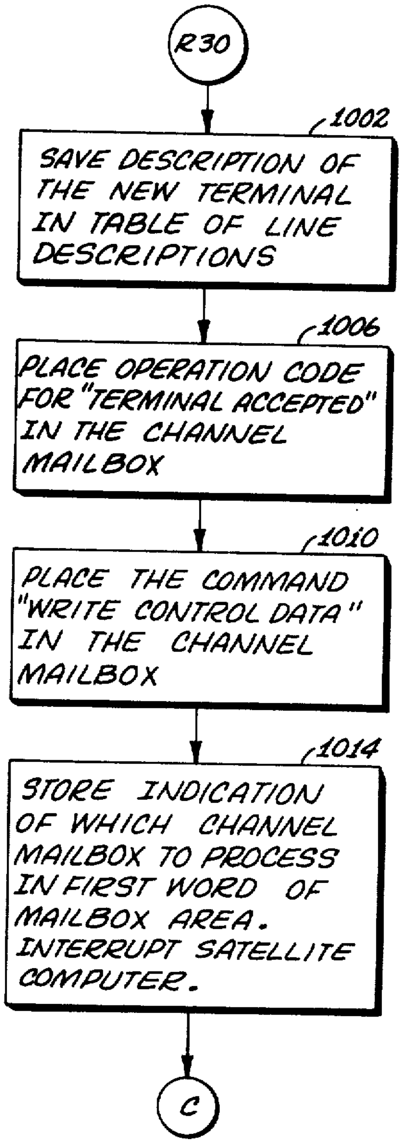

The first step of subroutine R30, as indicated by block 1002 of FIG. 10, is to save the description of the new terminal as found in the channel mailbox in a table of line descriptions. This table, found in the central computer's memory, is for maintaining a record of the terminals with which the central computer is communicating. Next, the central computer places the operation code for "terminal accepted" in the channel mailbox (block 1006) and then places the command "write control data" in the channel mailbox (1010). The operation code "terminal accepted," as the name implies, indicates to the satellite computer that the central computer will respond to the request of the new terminal requesting service. The command "write control data," as previously mentioned, directs the satellite computer to perform certain control operations such as disconnecting a terminal line, terminating further input from a terminal, etc. In the last step of the subroutine R30, the central computer stores an indication of which channel mailbox to process, and then interrupts the satellite computer. The process then returns via link C to block 814 of FIG. 8A.

Figure 11:
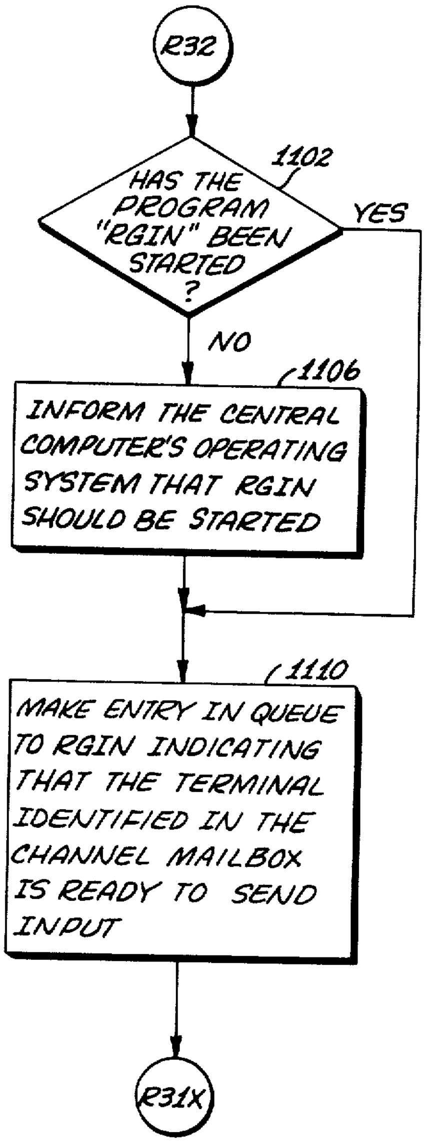

Returning now to the description of the subroutine TRC of FIG. 9, if this subroutine determines that the operation code and the channel mailbox is "accept input" (block 906), the subroutine R32 is entered. FIG. 11 shows a flow chart of this subroutine.

The first step of the subroutine R32, as indicated by block 1102 of FIG. 11, is to determine if a program referred to as RGIN has been started. This program directs the collection of input data by the central computer from the terminals. If it is determined that the program RGIN has not been started, the central computer's operating system is informed that the program should be started (block 1106) and an entry is made in a certain queue utilized by RGIN to indicate that the terminal identified in the channel mailbox is ready to send input (block 1110). If it is determined that the program RGIN has been started, the subroutine moves directly to block 1110 where the entry is made. Preparation by the central computer for the receiving of input will be discussed later when discussing the interrupt procedure (of the central computer) utilized by the program RGIN. After concluding the step represented by block 1110, the subroutine R32 moves via link R31X to block 858 of FIG. 8C.

Figure 12:
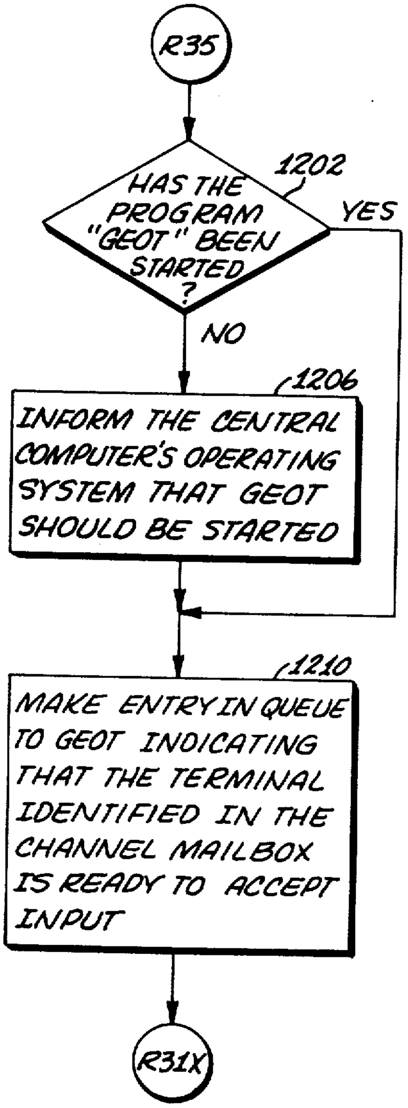

Returning again to FIG. 9, if it is determined that the operation code is not "accept input," the subroutine TRC moves to block 910 where it is determined whether the operation code is "send output." If it is, the process enters subroutine R35 shown in FIG. 12.

The function of the subroutine R35 is to make preparations for transmitting data from the central computer to the satellite computer. The first step of this subroutine, as indicated by block 1202 of FIG. 12, is to determine if a program referred to as "GEOT" has been started by the central computer. This program controls transmission of data from the central computer to the satellite computer as will be described later. If GEOT has not been started, the central computer's operating system is informed that it should be started in accordance with block 1206. If it has been started, the subroutine goes to block 1210 where an entry is made in a queue associated with the program GEOT indicating that the terminal identified in the channel mailbox is ready to accept input. Then, as with the subroutine R32, the subroutine R35 moves via link R31X to block 858 of FIG. 8C.

Figure 13:
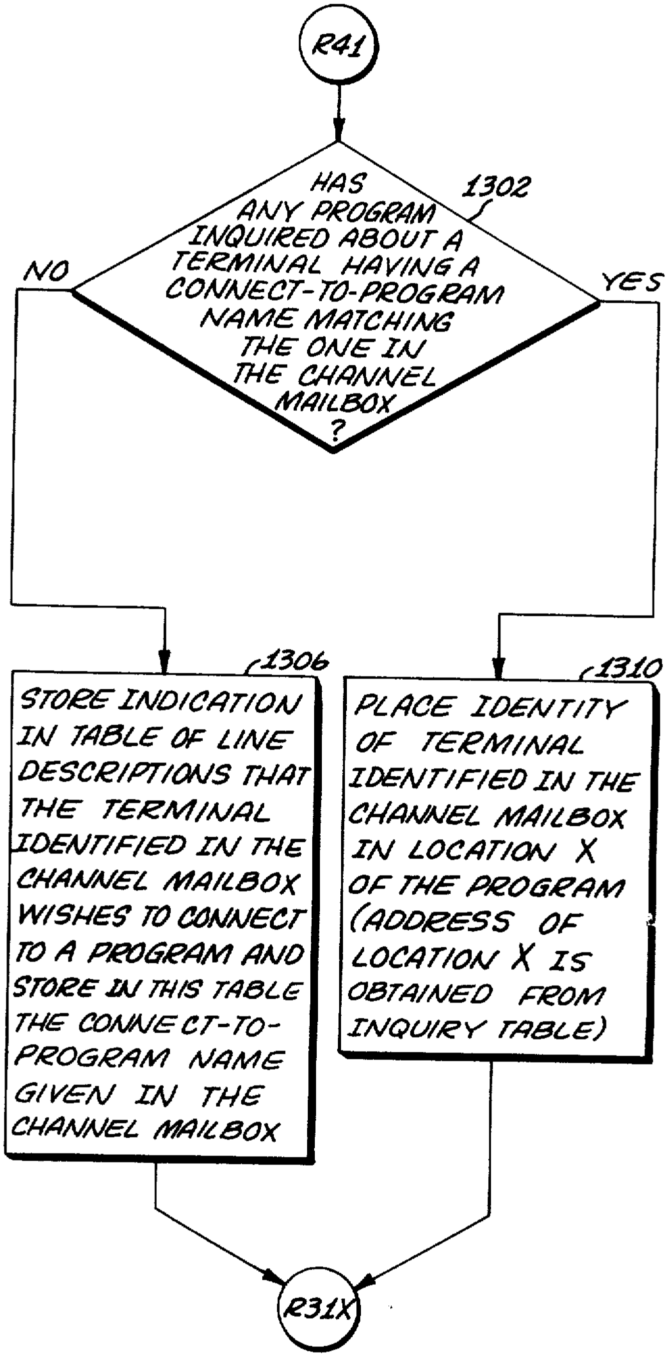
Figure 14:
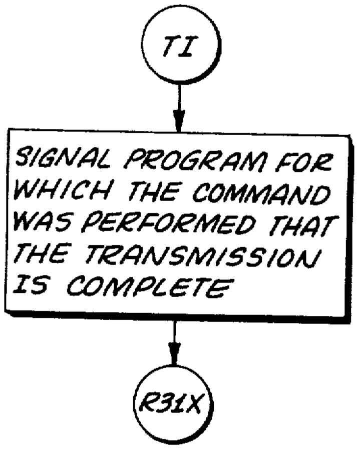

Returning again to FIG. 9, if it is determined that the operation code is not "send output," the subroutine TRC moves to block 914 where it is determined if the operation code is "connect to program." If it is, TRC enters a subroutine R41 shown in FIG. 13.

The function of subroutine R41 is to make preparations in the central computer for the "connection" between a terminal and a central computer program. Such "connection" allows a terminal to communicate with a program.

The first step of the subroutine R41, as indicated by step 1302 of FIG. 13, is to determine if any program in the central computer has inquired about a terminal having the same connect-to-program name as the one in the channel mailbox. This determination is made by searching an inquiry table. (The inquiry table will be discussed later when discussing the procedure utilized by a central computer program wishing to communicate with a terminal [FIG. 17].) The connect-to-program name found in the channel mailbox will have been placed there by the satellite computer as part of the "other terminal information" of step 506 of FIG. 5. The names are utilized to identify programs in the central computer with which the terminals desire to communicate. If it is determined that no program has inquired about a terminal having a similar connect-to-program name, an indication is stored in the table of line descriptions that the terminal identified in the channel mailbox wishes to connect to a program (block 1306 of FIG. 13). The connect-to-program name given in the channel mailbox is also stored in this table. The subroutine then moves via link R31X to block 858 of FIG. 8C.

If it is determined by the step represented by block 1302 of FIG. 13 that a program has inquired about a terminal having the same connect-to-program name, the subroutine moves to block 1310. In the step represented by block 1310, the identity of the terminal identified in the channel mailbox is stored in location X of the program having inquired. The address of the location X is obtained from the inquiry table. The function of the step represented by block 1310 is to initialize conditions which will allow a particular program and a particular terminal to communicate when such communication becomes necessary. After this step, the subroutine moves from block 1310 via link R31X to block 858 of FIG. 8C.

Returning again to FIG. 9, if the subroutine TRC determines that none of the four illustrative operation codes are present in the channel mailbox, it may then check for other operation codes not specifically shown or described here (block 918). After checking for such operation codes, and performing the indicated operations, the subroutine would move via link R31X to block 858 of FIG. 8C.

Returning now to FIG. 8B and specifically block 846, if it is determined by the step represented by block 846 that the command in the identified channel mailbox is not "read control data," the algorithm would move to block 850. There, it is determined whether the command in a channel mailbox is either "read text" or "write text." If either of these commands are present, the algorithm enters subroutine TI shown in FIG. 14. The operation performed by this subroutine is simply the signaling of the program for which the command "read text" or "write text" was performed that the transmission (either to or from the program) is complete. The fact that this branch of the algorithm was entered in response to a terminate interrupt indicates that the operation specified by the command in the channel mailbox has been accomplished by the satellite computer (after which the terminate interrupt occurred).

Figure 8B:
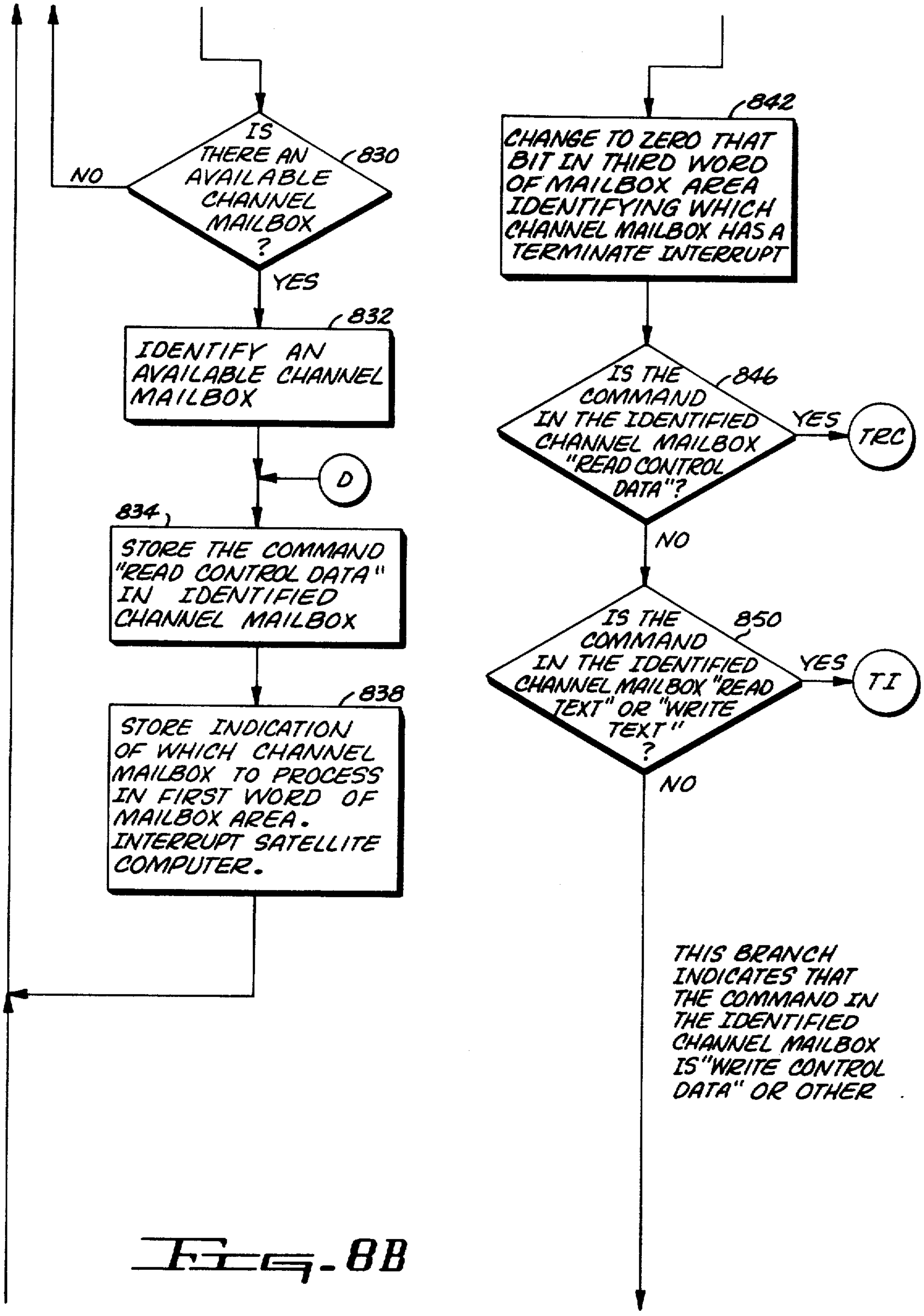
Figure 8C:
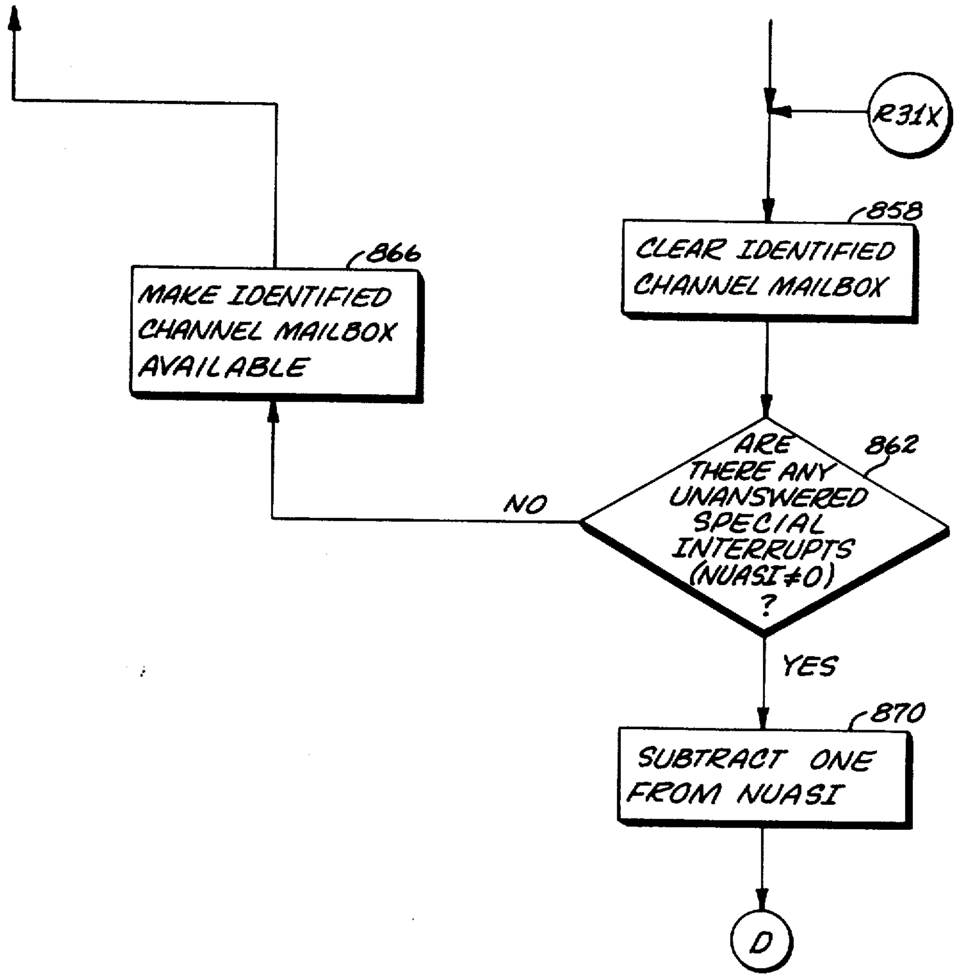

A determination, in the step represented by block 850, that the command in the channel mailbox is neither "read text" nor "write text" indicates that the command is one which requires no further action by the central computer other than moving to block 858 of FIG. 8C. The user, of course, could provide for other commands where special action was required but for purposes of the present invention such other exemplary commands need not be discussed.

All but one of the subroutines carried out in response to the command and operation code found in the channel mailbox ultimately terminated in link R31X leading to block 858. The step represented by this block is the clearing of the identified channel mailbox of its contents in preparation for utilization of the channel mailbox for another transaction. After the channel mailbox is cleared, the algorithm moves to block 862 where it is determined whether there are any unanswered special interrupts. That is, it is determined whether NUASI is not equal to zero. If it is determined that there are no unanswered special interrupts (i.e. NUASI equals zero), then the identified channel mailbox is made available for subsequent transactions (block 866) and the algorithm returns to block 814 of FIG. 8A.

If it is determined that there are unanswered special interrupts, then, in accordance with block 870 of FIG. 8C, the count in NUASI is reduced by one and the algorithm moves via link D to block 834 of FIG. 8B. Block 834 commences a sequence of operations, as discussed previously, for processing special interrupts. In this fashion, unanswered special interrupts are processed. This concludes the description of an illustrative operation of the central computer undertaken in response to an interrupt by the satellite computer.

Figure 15:
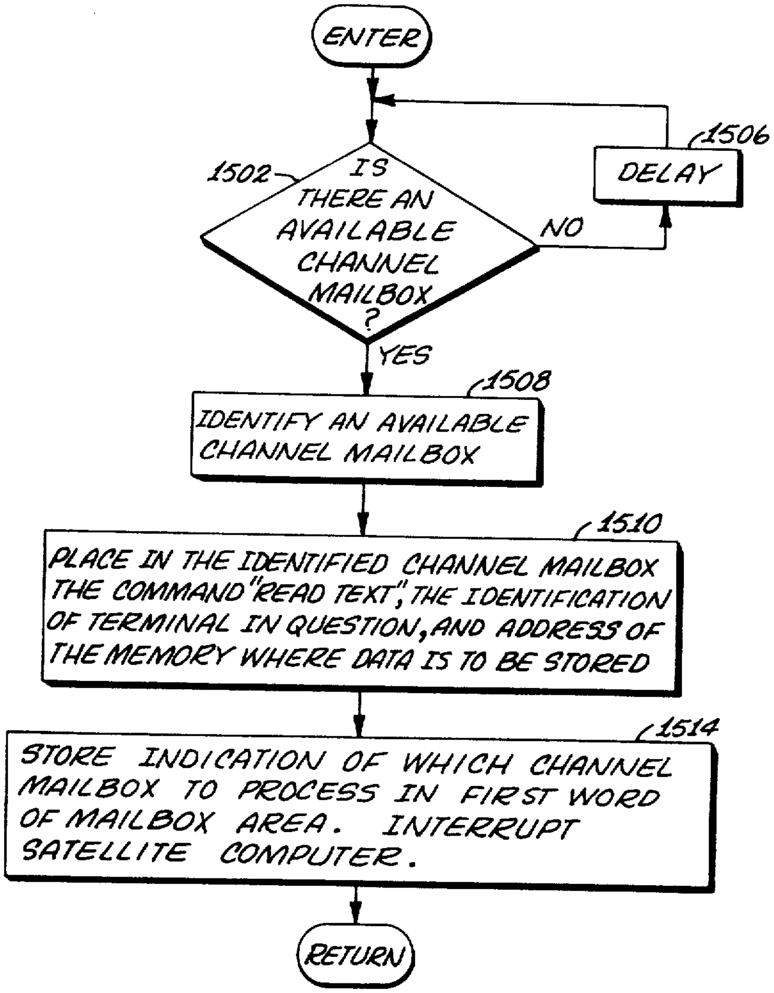
FIGS. 15, 16 and 17 show flow diagrams of specific illustrative subroutines utilized by central computer programs when the programs desire to interrupt a satellite computer.

Earlier, the program RGIN was referred to in connection with the subroutine R32 of FIG. 11. As was then mentioned, this program controls the collection of input from the terminals to be processed by the central computer. Since the collection and processing of input data by the central computer is not considered part of the present invention, the program RGIN will not be discussed in detail. RGIN is started in response to an entry in the queue to RGIN (see block 1110 of FIG. 11), after which it calls upon a subroutine to establish the conditions under which the transmission of input can take place. The flow chart of this subroutine is shown in FIG. 15. The first step of this subroutine is to determine whether there is an available channel mailbox (block 1502). If there is not, the subroutine delays a short time (block 1506) and then again inquires as to whether there is an available channel mailbox. If there is, an available channel mailbox is identified (block 1508), after which the subroutine places therein the command "read text," the identification of the terminal in question, and the address of the central computer's memory where the input data is to be stored (block 1510). An indication of which channel mailbox to process is then stored in the first word of the mailbox area and the satellite computer is interrupted (block 1514). The subroutine then returns control to the program RGIN.

The program GEOT was also mentioned earlier in connection with the subroutine R35 of FIG. 12. This program is one which holds output data for other programs and controls the transmission of the output data to the appropriate terminals when such terminals are ready to receive it. The program GEOT is started in response to an entry in the queue to GEOT (see block 1210 of FIG. 12), after which the program enters the subroutine represented in FIG. 16. The first step of this subroutine, as with the subroutine of FIG. 15, is to determine whether there is an available channel mailbox. If there is not, the subroutine delays (block 1606) and then again inquires as to the availability of a channel mailbox. After an available channel mailbox is identified (block 1608), the subroutine places therein the command "write test," the identification of the terminal ready to receive output, the location of the data in the central computer's memory to be transmitted to the terminal and a tally word indicating the amount of data to be transmitted (block 1610). An indication of which channel mailbox to process is then stored in the mailbox area and the satellite computer is interrupted (block 1614). Control is then returned to the program GEOT.

Figure 17:
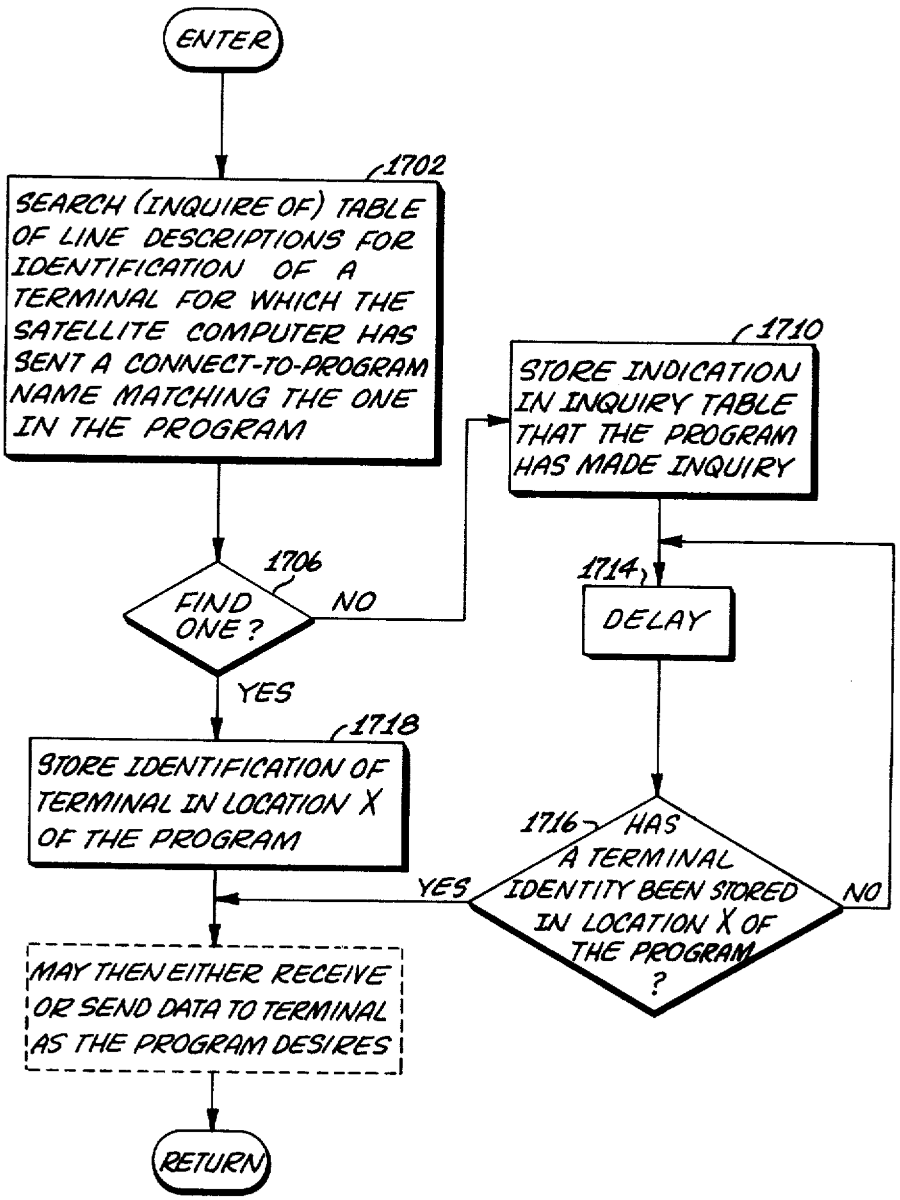

FIG. 17 shows the process carried out in the central computer when a program which has been running in the central computer makes an inquiry as to whether any terminal desires to "connect" to the program. This process was mentioned earlier when discussing the subroutine R41 of FIG. 13. The inquiry is made in accordance with the step represented by block 1702 of FIG. 17 wherein the program in question examines the table of line descriptions for identification of a terminal for which the satellite computer has sent a connect-to-program name matching the one assigned to the program. If such a name is not found, then in accordance with block 1706 and 1710, information is stored in an inquiry table indicating that the program in question has made inquiry. This information includes the identity of the program, the connect-to-program name assigned to the program, and a location X address which, as noted earlier, is utilized by the subroutine R41 of FIG. 11. Recall that the subroutine R41 examines the inquiry table to determine if a program has made an inquiry and if it has, R41 places the identity of a particular terminal identified in a particular channel mailbox in location X specified by the program.

Figure 16:
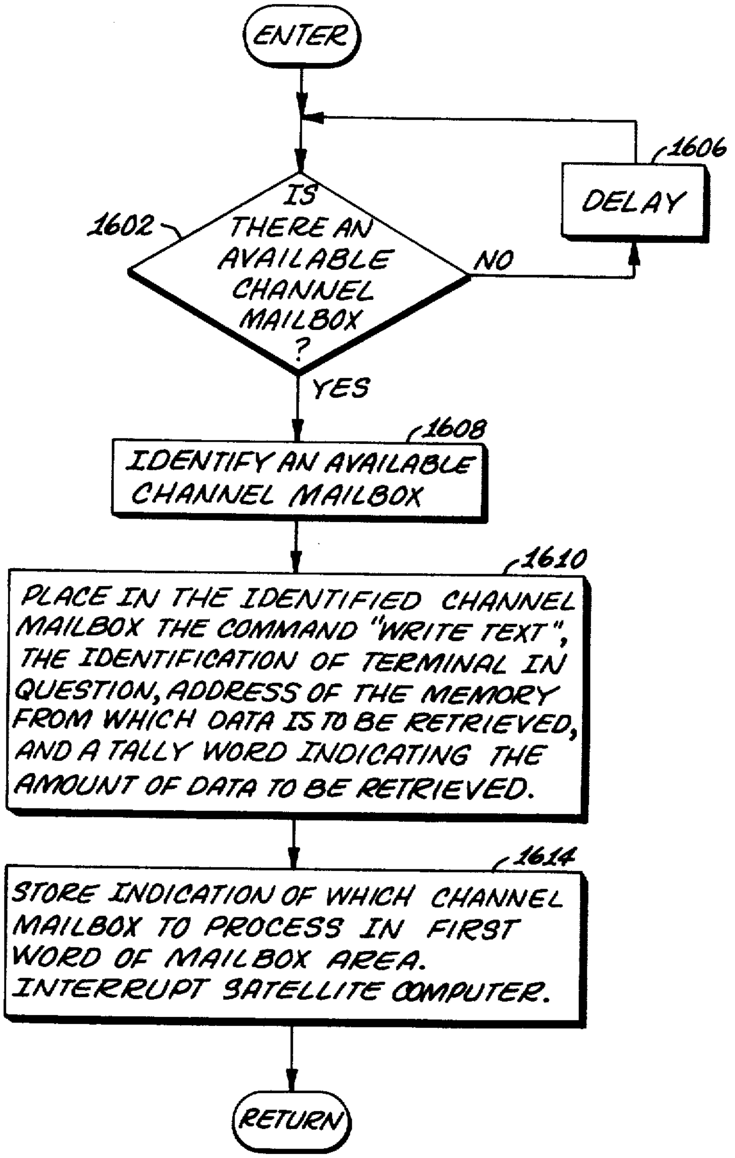

After the process of FIG. 17 stores the information in the inquiry table, it delays for a period of time (block 1714) and then examines location X of the program to determine if a terminal identify has been stored therein (block 1716). Such an identity may have been so stored in accordance with block 1310 of FIG. 13. If no terminal identity is found in location X, the process returns to block 1714 and again delays for a period time before examining location X. If a terminal identity is found, the program in question and the terminal whose identity is found in location X are now in a position to initiate communication with each other. Such communication would be initiated in essentially the same manner as described for the program RGIN (FIG. 15) and GEOT (FIG. 16).

If a connect-to-program name is found in the table of line descriptions which matches the name assigned to the program in question, the process moves to block 1718 where the identification of the terminal is stored in location X of the program. This is done since there may be more than one terminal with which the program is communicating and it is necessary to keep track of all such terminals. At the completion of this step, the program and terminal in question may initiate communication with each other as discussed above.

Example Processing of Transactions

The apparently parallel processing of several transactions will now be illustrated by way of example. In this example, the operations performed by the satellite computer and the central computer in the course of processing the exemplary transactions are shown in the table of composite FIG. 18 (comprising FIGS. 18A-18I). All events or operations shown in the left column of the table under the heading "Satellite Computer" are those performed by the satellite computer, whereas the operations shown in the right column of the table under the heading "Central Computer" are those performed by the central computer. The operations performed by the satellite computer are numbered from 1 to 63 for ease of reference and the operations performed by the central computer are numbered from 101 to 181.

The first event illustrated in the table is one which acts as a stimulus to the satellite computer. This event, identified as item no. 1 of FIG. 18A, is a notification of the satellite computer that a terminal A (already connected to the satellite computer) has data to send to the central computer. In response to this, the satellite computer adds one to its special interrupt count ICCSPC (item no. 2). (It should be noted here that only the more general processing steps are shown in the table of composite FIG. 18. Detailed steps such as "bookkeeping" steps are generally not shown. For example, the step of saving the terminal identity in a rotating queue no. 1, as described earlier in connection with block 200 of FIG. 2, is not shown in the table of composite FIG. 18.)

In accordance with item 3 of FIG. 18A, the contents of ICCSPC are added to the count in the second word of the central computer's mailbox area (MBXA). (This operation is carried out in accordance with the step represented by block 438 of FIG. 4B.) The satellite then interrupts the central computer (item 4 of FIG. 18A) and determines that no more requests are awaiting processing (item 5). The satellite computer is now free to commence other processing operations.

In response to the interruption by the satellite computer, the central computer compares the count stored in the second word of MBXA with the number of special interrupts processed or answered as indicated by the count in NSIP (item 101 of FIG. 18A). The correspondence with the step represented by block 814 of FIG. 8A should be noted. Assuming that the counts, at this stage of the description of the example, are not equal, the central computer adds a one to NSIP (item 102) and then selects an available channel mailbox MBX($i$) (item 103). The central computer then places the command "read control data" in the selected MBX($i$) (item 104) and the channel number ($i$) in the first word of MBXA (item 105). In accordance with item 106, the central computer next interrupts the satellite computer and then, in accordance with item 107, determines that no more interrupts are awaiting processing.

Figure 18B:
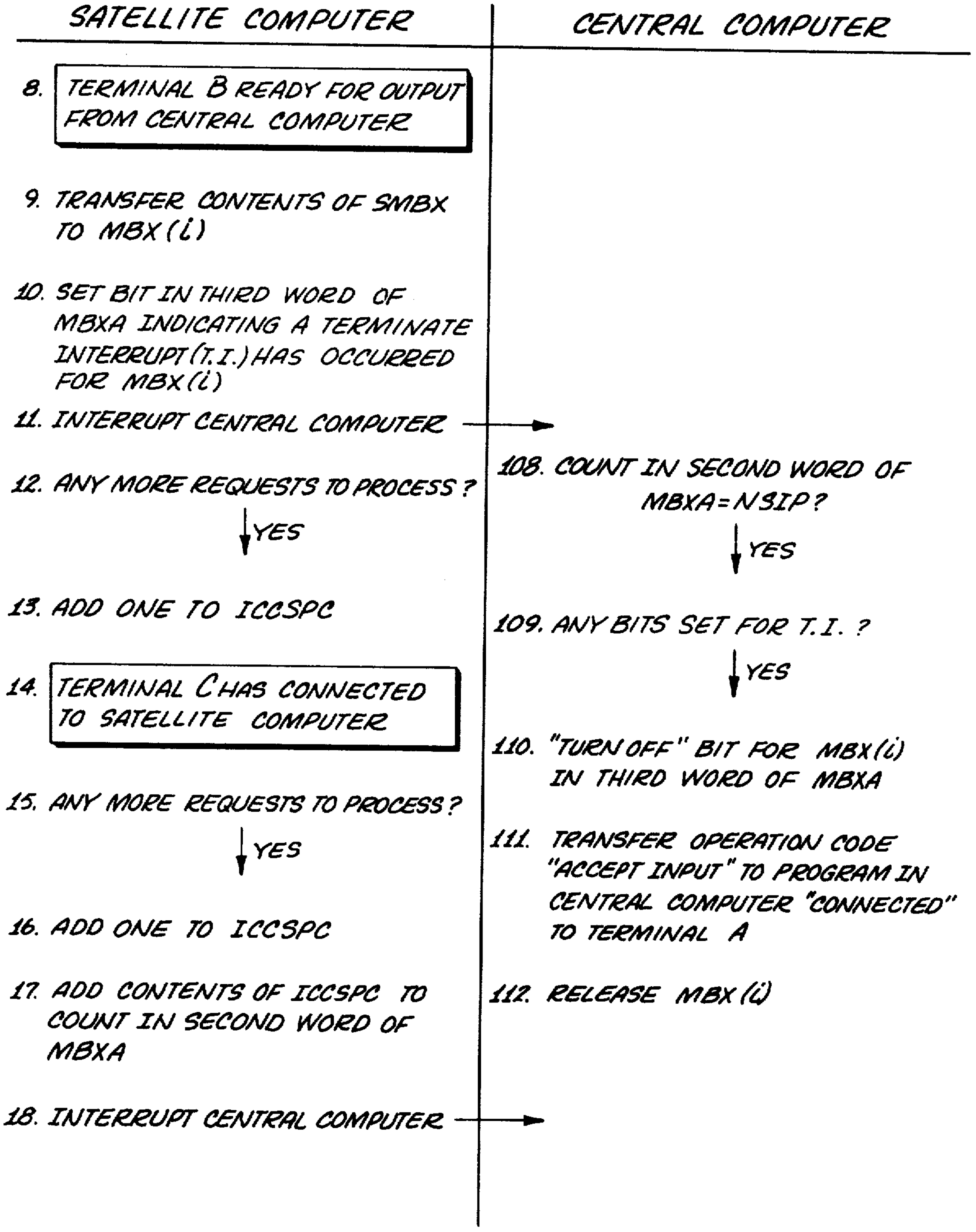

In response to the interruption by the central computer, the satellite computer reads the contents of MBX($i$) in accordance with item 6 of FIG. 18A. The satellite computer then places the terminal A identification and "accept input" operation code in the satellite computer's mailbox storage area (SMBX) and transfers the contents of SMBX to MBX($i$) (items 7 and 9). While this was taking place, a second outside stimulus occurred, viz notification by a terminal B that it is ready to receive output from the central computer (item 8). The next steps performed by the satellite computer are to set a bit in the third word of MBXA to indicate that a terminate interrupt (T.I.) has occurred for MBX($i$) and then to perform such interruption of the central computer (items 10 and 11 of FIG. 18B).

Up to this point of the description of the example, most of the operations of the satellite computer and the central computer have been carried out in a serial manner. Hereafter, however, many of the operations will be carried in parallel as is apparent from an examination of the table of composite FIG. 18. Thus, while the central computer commences to process the interrupt of item 11 of FIG. 18B, the satellite computer continues to respond to requests from terminals.

The next outside event to occur is the notification of the satellite computer by a terminal C that it has connected to the satellite computer (item 14). This notification plus the notification in item 8 are processed by the satellite computer in accordance with items 12 through 18 of FIG. 18B.

In response to the interrupt of item 11, the central computer determines that the interrupt was a terminate interrupt requiring notification of the program in the central computer "connected" to terminal A that it is to accept input from terminal A (items 108 through 111). This operation corresponds to steps 814, 818, 842 and 846 of FIGS. 8A and 8B, steps 902 and 906 of FIG. 9, and all steps of FIG. 11. A program is "connected" to a terminal when, as discussed earlier, the steps necessary for the program to communicate to the terminal have been taken by the satellite and central computers. After the program in the central computer has been notified, the channel mailbox (MBX($i$) is released (item 112). This corresponds to step 858 of FIG. 8C.

Figure 18D:
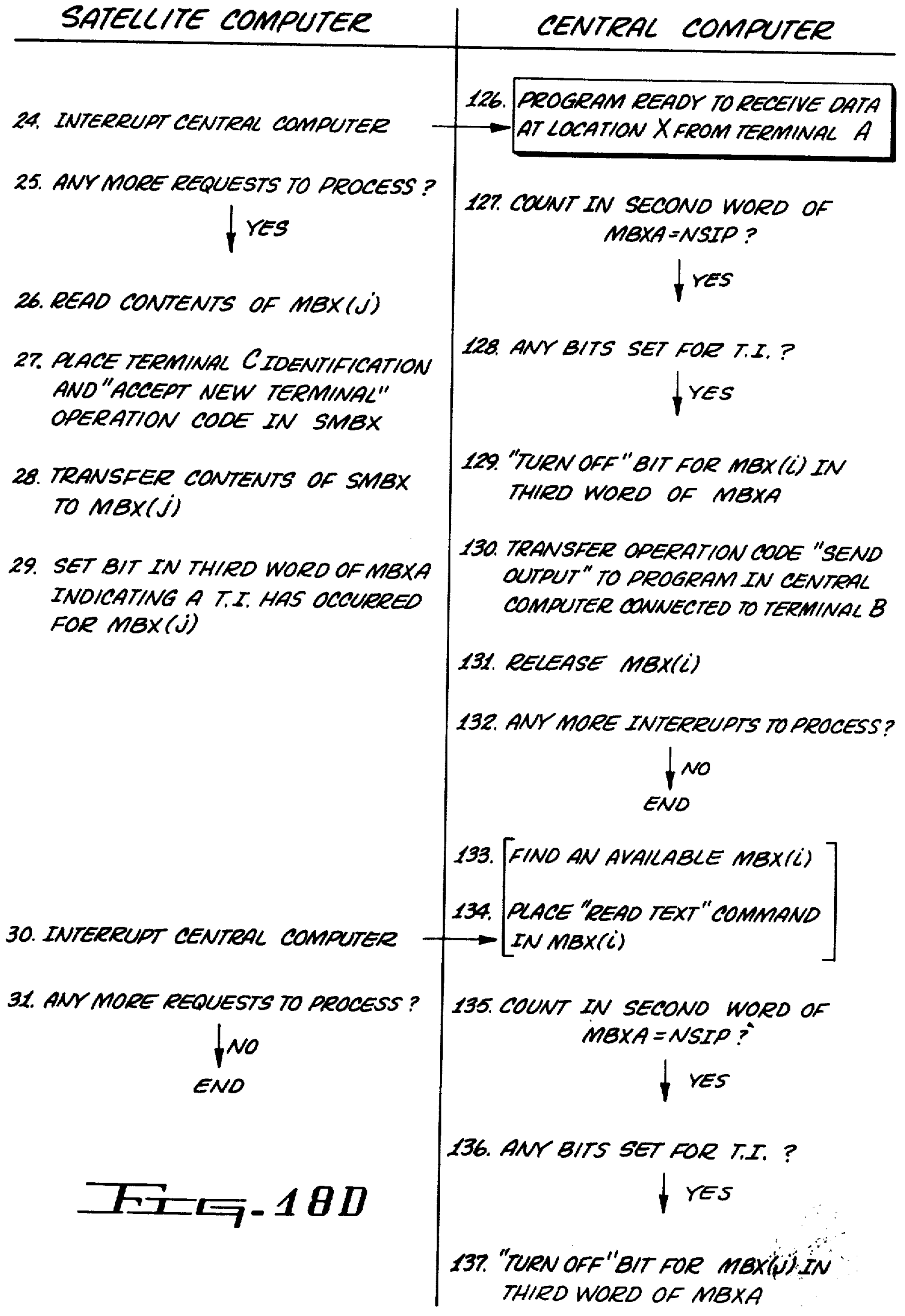
Figure 18E:
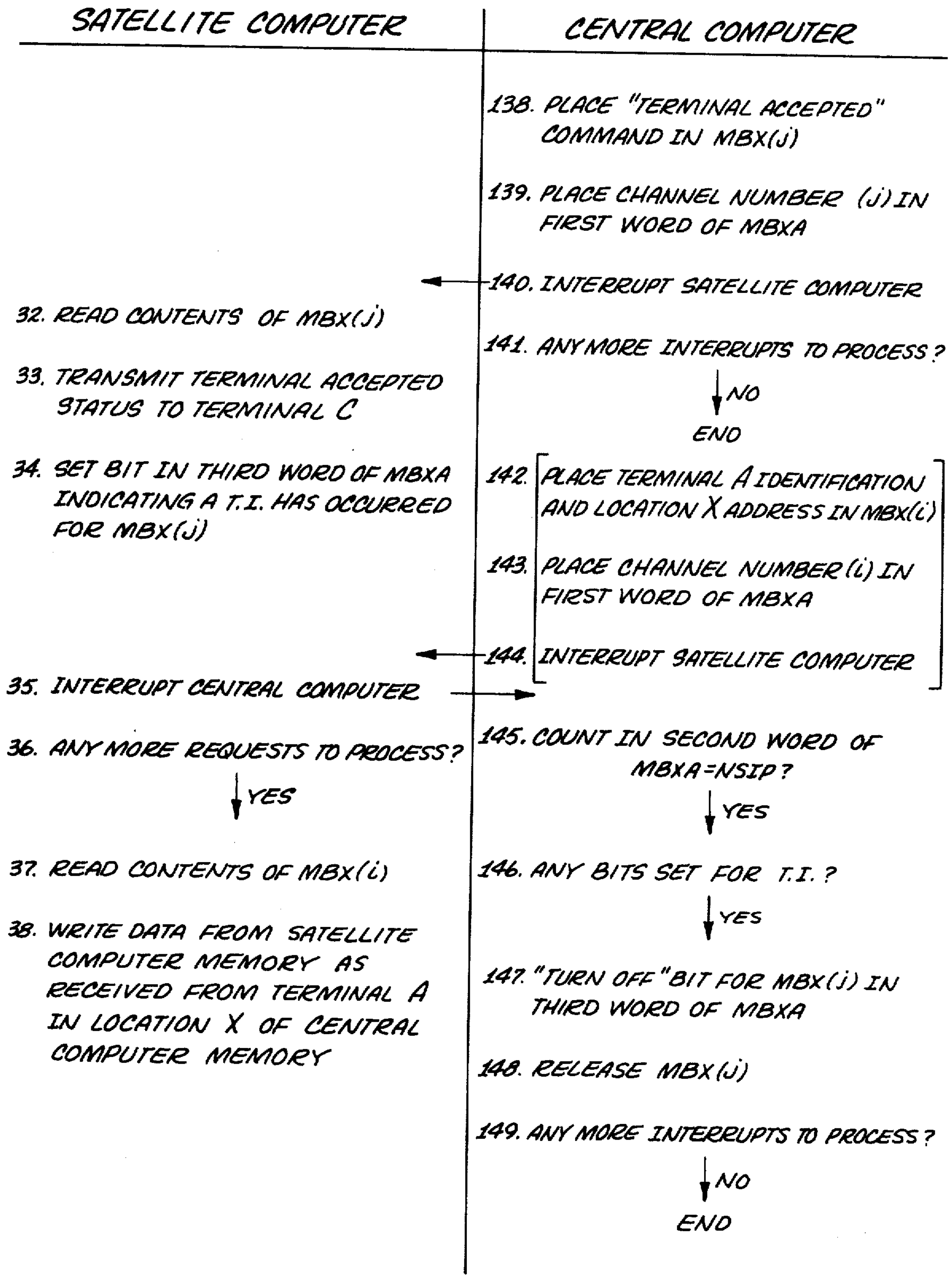
Figure 18F:
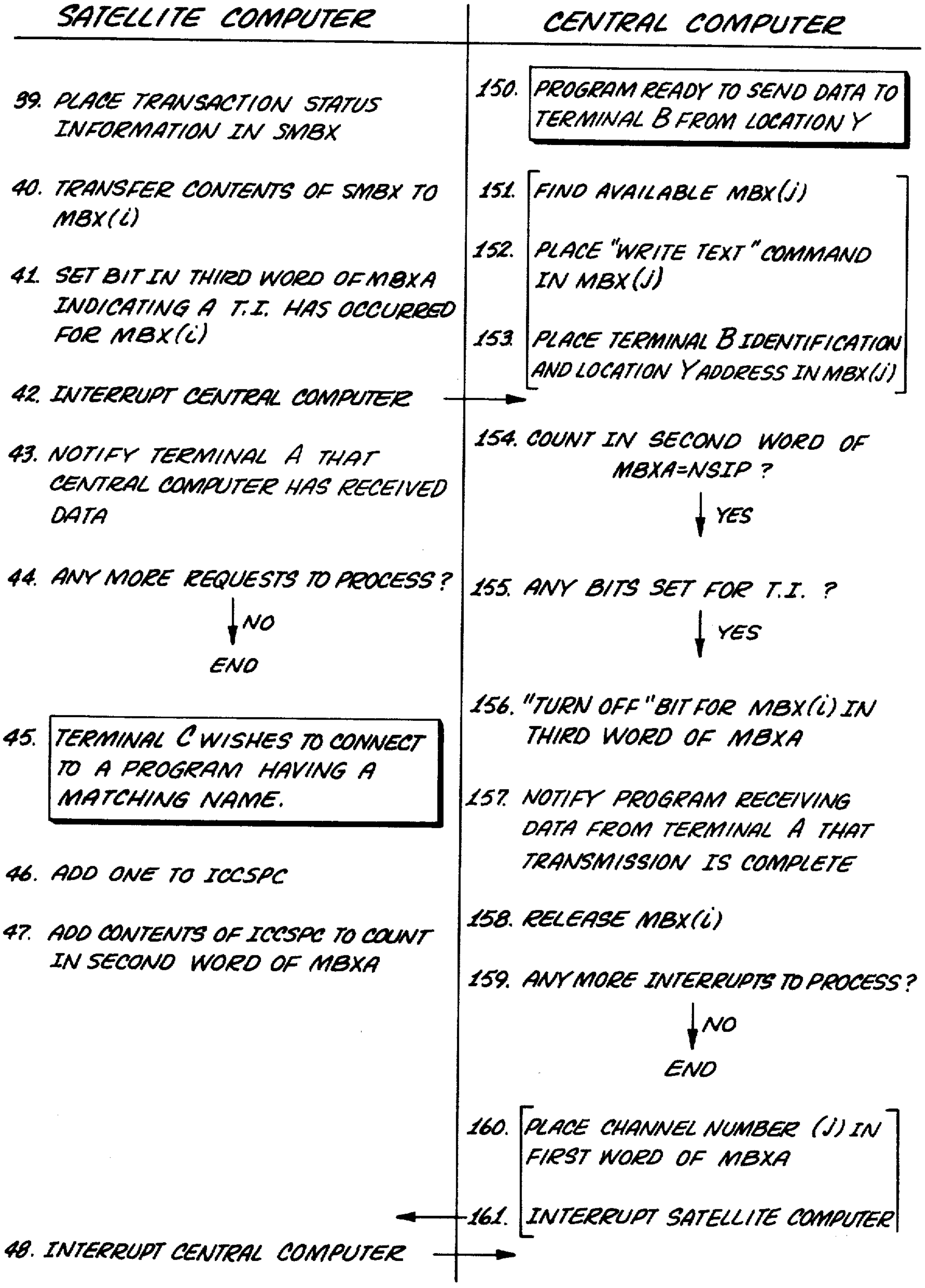

The next event to occur with respect to the request by terminal A is item 126 of FIG. 18D. In item 126, the program "-connected" to terminal A notifies the central computer that it is ready to receive data at memory location X from terminal A. The central computer would normally commence to respond to such notification from the program, but in this case, the satellite computer has just interrupted the central computer (item 24). When the central computer is interrupted by the satellite computer, and the central computer is not processing a previous interrupt from the satellite computer, the central computer suspends its current operation and commences to process the satellite computer interrupt. Thus, in the present example, the central computer suspends its response to the program notification (item 126) to respond to the interrupt from the satellite computer. After completion of the processing of the interrupt, as signified in item 132, the central computer continues its response to the program notification. That is, the central computer selects an available channel mailbox MBX($i$) and places the command "read text" therein (items 133 and 134 of FIG. 18D). The brackets placed around the operations designated as items 133 and 134 are used to indicate that the central computer has commenced a previously interrupted operation.

At the completion of item 134, the central computer is again interrupted by the satellite computer (item 30 of FIG. 18D). At the conclusion of processing this latest interrupt, the central computer resumes its operation in item 142 of FIG. 18E. Upon such resumption, the central computer places the terminal A identification and the location X address in MBX($i$). The central computer then places the channel number ($i$) in the first word of MBXA and interrupts the satellite computer (items 143 and 144). The satellite computer, in response to this interrupt, reads the contents of MBX($i$) (item 36 of FIG. 18E) and in response to the "read text" command, writes data from its memory (as received earlier from terminal A) in location X of the central computer memory. The satellite computer then notifies the central computer and terminal A that the transmission of data from terminal A to the program "connected" to terminal A is completed (items 38 through 42 of FIGS. 18E and 18F). The central computer also notifies the program that the transmission is complete (item 157). This concludes the transaction initiated in item 1 of FIG. 18A of transmitting data from terminal A to the central computer.

The steps necessary to perform the other transactions illustrated in composite FIG. 18 are self explanatory and will not be discussed in detail. Such transactions include transmitting information from the central computer to terminal B (see item 8 of FIG. 18B and item 150 of FIG. 16F) and connecting terminal C to a program having a matching name (see item 14 of FIG. 18B and item 44 of FIG. 18F).

The composition of illustrative computer programs for carrying out the disclosed algorithm and methods is considered well within the skill of the art in view of the disclosure herein. Specific program listings are therefore not included herein.

It is to be understood that the above-described embodiments are only illustrative of the application of the principles of the present invention. Numerous modifications may be devised by those skilled in the art without departing from the spirit and scope of the invention.

What is claimed is:

1. In a data processing system comprising a central computer interconnected with at least one satellite computer, a method of operating said central computer and satellite computer to enable communication therebetween comprising the steps of:

a. said satellite computer signaling said central computer that at least one transaction needs processing, b. said central computer, in response to said signaling, communicating to said satellite computer the identity of one of a plurality of storage areas in said central computer's memory, c. said satellite computer storing in said identified storage area an operation code word indicating that either transmission of data to the central computer or retrieval of data from the central computer is desired, d. said central computer, in response to said operation code, storing in an available one of said plurality of storage areas information indicating either that data is to be transmitted to a particular location in said central computer's memory or that data is to be retrieved from a particular location in said central computer's memory, and e. said satellite computer either transmitting to or retrieving data from said central computer's memory in accordance with said information.

2. A process as in claim 1 wherein step (a) further comprises the steps of:

f. said satellite computer incrementing a special interrupt count stored in said central computer's memory by an amount equal to the number of transactions needing processing, and g. said satellite computer sending an interrupt signal to said central computer.

3. A process as in claim 2 wherein step (b) further comprises the steps of:

h. said central computer, in response to said interrupt signal, selecting an available one of said plurality of storage areas, i. said central computer sending an interrupt signal to said satellite computer with an indication of the identity of said selected storage area, and j. said central computer performing steps (h) and (i) for each count in said special interrupt count.

4. A process as in claim 3 further comprising the step of:

k. said satellite computer, following the performance of step (c), sending an interrupt signal to said central computer with an indication of the identity of said selected storage area.

5. A process as in claim 4 wherein step (d) further comprises the steps of:

l. said central computer, in response to the interrupt signal of step (k), selecting an available one of said plurality of storage areas, m. said central computer storing in the storage area selected in step (1) a command word indicating either that data is to be transmitted to or retrieved from said central computer's memory and information identifying the address in said central computer's memory to which such data is to be transmitted or from which such data is to be retrieved, and n. said central computer sending an interrupt signal to said satellite computer with an indication of the identity of the storage area selected in step (L).

6. A process as in claim 5 further comprising the step of:

o. said satellite computer retrieving the contents of the storage area selected in step (l) prior to the performance of step (e).

7. In a data processing system comprising a central computer and at least one satellite computer interconnected by a communication channel, said central computer including a memory to which both the central computer and the satellite computer have direct access, said memory including a first area for storing control information and a plurality of other areas utilized for preparing for the transmission of data between said central computer and said satellite computer, said other areas each hereinafter referred to as a channel mailbox, a process of transmitting data between said central computer and said satellite computer comprising the steps of:

a. said satellite computer incrementing a special interrupt count in said first memory area by an amount equal to the number of transmissions to be made and sending an interrupt signal to said central computer, b. said central computer, in response to said interrupt signal, selecting an available channel mailbox MBX($i$), storing therein a first command word, and sending an interrupt signal to said satellite computer together with information identifying MBX($i$), c. said satellite computer, in response to the interrupt signal of step (b), retrieving said first command word from MBX($i$), storing in MBX($i$) an operation code word in response to said first command word, said code word indicating either that data is to be stored in said central computer's memory by said satellite computer or that data is to be retrieved by said satellite computer from said central computer's memory, and sending an interrupt signal to said central computer together with information identifying (MBX($i$), d. said central computer, in response to the interrupt signal of step (c), selecting an available channel mailbox MBX($j$), storing therein a second command word if said operation code word indicates that data is to be stored in said central computer's memory by said satellite computer, storing therein a third command word if said operation code word indicates that data is to be retrieved by said satellite computer from said central computer's memory, storing therein the address in the central computer's memory where such data is to be stored or from where such data is to be retrieved, and sending an interrupt signal to said satellite computer together with information identifying MBX($j$), and, e. said satellite computer storing data in the memory address specified in MBX($j$) if said second command word is stored in MBX($j$) or retrieving data from such memory address if said third command word is stored in MBX($j$).

8. A process as in claim 7 further comprising the steps of performing step (b) once for each count of said special interrupt count.

9. In a data processing system comprising a central computer and at least one satellite computer interconnected by a communication channel, and a plurality of input and output terminals connected to said satellite computer, said central computer including a memory in which both the central computer and the satellite computer may store data and from which both the central computer and satellite computer may retrieve data, said memory including a first area, MBXA, for storing control information and a plurality of other areas, each hereinafter referred to as a channel mailbox, utilized for communication between said central computer and said satellite computer, and said satellite computer including a memory, a method of operating said satellite computer to enable it to communicate with said central computer comprising the steps of:

a. storing in a first rotating queue in said satellite memory a signal representing the identity of a terminal requesting service and incrementing by one a special interrupt count ICCSPC in said satellite memory, in response to a request for service from the terminal, b. storing in a second rotating queue in said satellite memory the identity of the channel mailbox specified in MBXA and incrementing by one a central computer interrupt count ICC6CT in said satellite memory, in response to an interrupt signal from said central computer, c. going to step (d) if ICC6CT = 0, otherwise going to step (i), d. going to step (e) if ICCSPC ≠ 0, otherwise going to step (n), e. increasing a special interrupt count IC in MBXA by the number of counts in ICCSPC, f. setting ICCSPC = 0, g. sending an interrupt signal to said central computer, h. returning to step (c), i. decrementing ICC6CT by one, j. retrieving the next entry from said second retating queue, k. retrieving the contents of the channel mailbox identified by said next entry, l. performing certain subroutines in response to the presence of various command words in said channel mailbox contents, m. returning to step (c), and n. terminating the operation.

10. A method as in claim 9 wherein step (l) comprises the following steps if a first command word is present in said channel mailbox contents:

o. fetching one of a plurality of operation codes from the terminal identified by the next entry of said first rotating queue, p. storing in a portion SMBX of said satellite computer's memory said fetched operation code and the identity of the terminal identified by said next entry of said first rotating queue, q. transferring the contents of SMBX to the channel mailbox identified by said next entry of said second rotating queue, r. sending a terminate interrupt signal to said central computer identifying the channel mailbox in which the contents of SMBX were stored in step (q), s. returning to step (c).

11. A method as in claim 10 wherein step (l) comprises the following steps if a second command word is present in said channel mailbox contents:

t. storing data at that address in the central computer's memory specified by said channel mailbox contents, u. storing information in SMBX indicating that data has been stored in the central computer's memory, v. returning to step (q).

12. A method as in claim 11 wherein step (l) comprises the following steps if a third command word is present in said channel mailbox contents:

w. retrieving data from that address in the central computer's memory specified by said channel mailbox contents, x. storing information in SMBX indicating that data has been retrieved from the central computer's memory, and y. returning to step (q).

13. In a data processing system comprising a central computer and at least one satellite computer interconnected by a communication channel, and a plurality of input and output terminals connected to said satellite computer, said central computer including a memory having a first area, MBXA, for storing control information and a plurality of other areas, each hereinafter referred to as a channel mailbox, utilized for communication between said central computer and said satellite computer, a method of operating said central computer to enable it to communicate with said satellite computer comprising the steps of:

1 adding one to a count NSIP in said central computer's memory if a special interrupt count IC in MBXA does not equal NSIP, otherwise going to step (9), 2. adding one to an unanswered special interrupt count NUASI if no channel mailbox is available, otherwise going to step (4), 3. returning to step (1), 4. identifying an available channel mailbox, 5. storing a first command word in said identified channel mailbox, 6. storing the identity of said identified channel mailbox in MBXA, 7. sending an interrupt signal to said satellite computer together with the identity of said identified channel mailbox, 8. returning to step (1), 9. going to step (10) if a terminate interrupt signal and channel mailbox designation has been received from said satellite computer, otherwise going to step (22), 10. going to step (11) if said first command word is present in the channel mailbox designated in step (9), otherwise going to step (18), 11. going to step (12) if a first operation code is present in said designated channel mailbox, otherwise going to step (17), 12. storing in a table of line descriptions in said central computer's memory the identity of the terminal specified in said designated channel mailbox, 13. storing a second operation code and a second command word in said designated channel mailbox, 14. storing the identity of said designated channel mailbox in MBXA, 15. sending an interrupt signal to said satellite computer together with the identity of said designated channel mailbox, 16. returning to step (1), 17. performing certain operations in response to the presence of various operation codes in said designated channel mailbox, 18. clearing said designated channel mailbox of its contents, 19. returning to step (1) if NUASI = 0, otherwise going to step (20), 20. subtracting one from NUASI, 21. returning to step (5), and 22. terminating the operation.

14. A method as in claim 13 wherein step (17) comprises the steps of:

23. storing an entry in a first queue indicating that the terminal specified in said designated channel mailbox is ready to send the data, in response to the presence of a third operation code in said designated channel mailbox, 24. going to step (18).

15. A method as in claim 14 wherein step (17) further comprises the steps of:

25. storing an entry in a second queue indicating that the terminal specified in said designated channel mailbox is ready to receive data, in response to the presence of a fourth operation code in said designated channel mailbox, 26. going to step (18).

16. A method as in claim 15 wherein step (17) further comprises the steps of:

27. searching an inquiry table for an indication that some program has made an inquiry, in response to the presence of a fourth operation code in said designated channel mailbox, 28. storing in a location X of a certain program the identity of the terminal specified in said designated channel mailbox in response to an indication in said inquiry table that said certain program has made an inquiry, 29. storing in a table of line descriptions an indication that the terminal specified in said designated channel mailbox wishes to connect to a certain named program, in response to an indication in said inquiry table that no program has made an inquiry, and 30. going to step (18).

17. A method as in claim 16 further comprising the following steps in response to the presence of an entry in said first queue of an indication that a specified terminal is ready to send data:

31. selecting an available channel mailbox, 32. storing in said selected channel mailbox a third command word, the identity of said specified terminal, and the address of the central computer's memory where data is to be stored, 33. storing the identity of said selected channel mailbox in MBXA, and 34. sending an interrupt signal to said satellite computer together with the identity of said selected channel mailbox.

18. A method as in claim 16 further comprising the following steps in response to the presence of an entry in said second queue of an indication that a specified terminal is ready to receive data:

35. selecting an available channel mailbox, 36. storing in said selected channel mailbox a fourth command word, the identity of said specified terminal, and the address of said central computer's memory from which data is to be retrieved, 37. storing the identity of said selected channel mailbox in MBXA, and 38. sending an interrupt signal to said satellite computer together with the identity of said selected channel mailbox.

19. A method as in claim 16 further comprising the following steps in response to a search request by a specified program:

39. searching said table of line descriptions for an indication of a terminal wishing to connect to said specified program, 40. storing in location X of said specified program the identity of a terminal specified in said table of line descriptions, if said searched for indication is obtained, otherwise going to step (42), 41. going to step (45), 42. storing an indication in said inquiry table that said specified program has made an inquiry, 43. delaying a certain predetermined period of time, 44. going to step (45) if a terminal identity has been stored in location X of said specified program, otherwise returning to step (43), 45. transmitting data to or retrieving data from the terminal identified in location X of said specified program as the program desires.

* * * * *

UNITED STATES PATENT OFFICE
CERTIFICATE OF CORRECTION

Patent No. 3,670,306 Dated June 13, 1972

Inventor(s) David J. Fox, Jane E. King and Orazio J. Nardelli

It is certified that error appears in the above-identified patent and that said Letters Patent are hereby corrected as shown below:

On the front page, right-hand column, after the heading "Attorney -" delete "Hanifin and Jancin and Homer L. Knearl" and substitute therefor -- Fred Jacob and Edward W. Hughes --.

Signed and sealed this 5th day of December 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE : 1969 O—366-334.